(12) United States Patent
Hetzner

(10) Patent No.: US 6,702,981 B2
(45) Date of Patent: Mar. 9, 2004

(54) LOW-CARBON, LOW-CHROMIUM CARBURIZING HIGH SPEED STEELS

(75) Inventor: Dennis W. Hetzner, Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/005,370

(22) Filed: Dec. 5, 2001

(65) Prior Publication Data

US 2002/0124911 A1 Sep. 12, 2002

Related U.S. Application Data

(63) Continuation-in-part of application No. 09/455,803, filed on Dec. 7, 1999, now abandoned.

(51) Int. Cl.$^7$ .......................... C22C 38/08; C22C 38/44; C22C 38/46; C22C 38/52
(52) U.S. Cl. ...................... 420/112; 420/119; 420/108; 420/109; 420/113; 420/129; 148/319
(58) Field of Search ................................. 420/105, 107, 420/108, 109, 111, 112, 113, 114, 129; 148/319

(56) References Cited

U.S. PATENT DOCUMENTS

| | | |
|---|---|---|
| 3,600,160 A | 8/1971 | Simcoe et al. |
| 3,928,025 A | 12/1975 | Okuno et al. |
| 4,004,952 A | 1/1977 | Jatczak et al. |
| 4,191,599 A | 3/1980 | Stickels et al. |
| 4,659,241 A | 4/1987 | Bamberger et al. |
| 5,560,787 A | 10/1996 | Takagi et al. |
| 5,741,374 A * | 4/1998 | Li ............................... 148/319 |
| 5,746,842 A | 5/1998 | Eguchi et al. |
| 5,919,578 A | 7/1999 | Lundell |
| 6,126,897 A | 10/2000 | Aihara et al. |

FOREIGN PATENT DOCUMENTS

| | | |
|---|---|---|
| FR | 2777023 A1 | 10/1999 |
| GB | 487254 | 6/1938 |
| GB | 1 220 620 | 1/1971 |
| JP | 55-34687 | 9/1978 |
| JP | 01-230723 A | 9/1989 |
| JP | 02-019425 A | 1/1990 |
| JP | 07-179988 A | 7/1995 |
| JP | 09-194987 A | 7/1997 |
| JP | 10-272592 A | 10/1998 |
| JP | 11-131193 A | 5/1999 |

OTHER PUBLICATIONS

"Carburizing and Carbonitriding", Chapter 2 (pp. 5–12) and Chapter 5 (pp. 26–30), *American Society for Metals*, Metals Park, Ohio (1977).

Hustead, T.E., "Consideration of Cylindrical Roller Bearing Load Rating Formula", *Society of Automotive Engineers*, New York, NY, 5 pp., Sep. 10–13, 1962.

\* cited by examiner

*Primary Examiner*—Deborah Yee
(74) *Attorney, Agent, or Firm*—Webb Ziesenheim Logsdon Orkin & Hanson, P.C.

(57) ABSTRACT

High speed steel (HSS) compositions having less C and Cr contents than standard grades of HSS to permit carburization using conventional techniques. The alloys contain less than 0.40 wt. % C and less than 2% Cr. The low Cr content is a critical factor in enhancing the ease of carburizing the present steels. The resulting HSS compositions possess high hardness and fracture resistance. More particularly, the steels include, in % by weight: 0–0.4% C; 0.5–1.5% Cr; 1.5–3.5% Ni; 0.1–0.6% M; 0.15–0.65% Si; 0.03 max % P; 0.03 max % S; one or more members selected from the group consisting of 4.0–15.3% Mo; 1.0–5.7% V; up to 13% Co and up to 28% W, and wherein the aggregate amount of %Cr+%Mo+%V+%W+%Co is between 7.5–35% and balance essentially Fe and incidental impurities. A method for treating the above alloy includes the steps of carburizing at about 960° C. followed by quenching, preheating to about 870° C. followed by austenitizing at 1125° C.–1225° C., quenching, and tempering twice at temperatures up to 550° C. followed by air cooling.

10 Claims, 21 Drawing Sheets

LOW-CARBON, LOW-CHROMIUM CARBURIZING HIGH SPEED STEELS

CROSS REFERENCE TO RELATED APPLICATION

This application is a continuation-in-part of U.S. patent application Ser. No. 09/455,803 filed Dec. 7, 1999, now abandoned.

BACKGROUND OF THE INVENTION

1. Field of the Invention

The invention relates generally to high speed steels and, more particularly, to a carburizable high speed steel having low carbon and chromium levels for use as roller bearings, taps and other applications where hardness and fracture resistance are required.

2. Description of the Related Art

It is well-known that stress state on or below a bearing race subjected to alternating contact loads can have a major influence on service life. Most tapered roller bearings are made from carburizing grades of steels. When components made from these grades are carburized and heat treated, some of the advantages realized relative to through hardened components are: fewer quench cracks in heat treating, a decreased sensitivity to grinding injury, and improved toughness or resistance to catastrophic failure which provide a more reliable product exhibiting fewer in-service problems.

For carburized components, the compressive residual stresses are developed during heat treating. The absorption of carbon into a component during carburizing creates a carbon gradient wherein the carbon level is highest near the surface and decreases as the distance away from the surface increases. Thus, the core of the component contains the nominal carbon content of the alloy. When steel components are quenched from the austenitizing temperature, martensite is formed. The transformation of austenite to martensite is accompanied by a volume expansion which is directly proportional to the carbon content of the alloy. When quenched, the surface of a component cools more rapidly than the inner portion of a component. In addition, the Ms temperature (the temperature at which austenite transforms to martensite) decreases with increasing carbon content. Thus, for a carburized component, relative to the core, the surface or so-called "case" transforms to martensite at a lower temperature than would occur for a component of uniform composition. Consequently, these two effects operating in unison cause a relatively high compressive residual stress to be formed on the surface layer or case. Comprehensive details of this type of processing are contained in "Carburizing and Carbonitriding", *American Society for Metals*, Materials Park, Ohio (1997).

This surface residual stress effect does not occur in components having a uniform composition, i.e., non-carburized components. The enhanced performance created by compressive surface residual stresses has resulted in processes being developed to carburize high carbon bearing alloys, such as that of U.S. Pat. No. 4,191,599 granted Mar. 4, 1980. The '599 patent discloses the carburizing of high carbon steels such as 52100 and M50 in carburizing atmospheres containing higher carbon potentials than used for standard carburizing steels. The carbon gradients produced lead to reasonable surface compressive residual stresses when these steels are quenched and tempered.

Another factor where compressive residual surface stresses are beneficial involves the press fitting of bearing components onto shafts. It is well-known that press fitting of bearings on shafts can create a tensile stress on the bearing. It has been demonstrated that the press fitting of through hardened AISI 52100 steel definitely has an adverse effect on fatigue life. However, similarly, press fit bearings fabricated from carburized AISI 8620 were found to perform satisfactorily. It was concluded that under press-fitting conditions, carburized AISI 8620 steel had superior fatigue characteristics compared to AISI 52100. This work was reported by T. E. Hustead, "Consideration of Cylindrical Roller Bearing Load Rating Formula", *SAE Preprint* 569A (Sept. 1962).

By way of example, consider a LM12749 bearing cone inner race made from carburized 8119 steel compared with the same inner race made from a through hardened 1.0% carbon 46100 steel having a uniform carbon gradient (uncarburized). The compressive stresses in the carburized bearing cone vary from −48.1 ksi on the surface to −22.6 ksi at a depth of 0.030" below the surface. For the bearing cone made from the through hardened 46100 high carbon alloy steel, the stress from the surface to 0.030" below the surface was, at most, only −3.8 ksi.

While carburized bearings fabricated from low carbon alloy steels have better properties than through hardened bearings fabricated from high carbon alloy steels, neither of these types of alloys performs well at continuous temperatures in excess of 400° F. Furthermore, brief exposures to temperatures of 500° F. or greater can significantly soften components manufactured from most alloy steels. In demanding applications such as jet engine main bearings, high speed steels (sometimes referred to as "HSS") such as M50 are selected. High speed steels have higher compressive yield stresses than alloy steels. The high compressive yield stresses of these steels are a direct result of the high carbon content of the HSS alloys and a presence of alloying elements such as chromium, molybdenum, vanadium and tungsten.

The heat treatments used for high speed steels are different from the heat treatments used for alloy steels. For example, a typical heat treating cycle for an alloy steel such as AISI 4340 would be to austenitize the material at 1550° F. until the entire component was equilibrated for one hour at the austenitizing temperature. The material would then be rapidly removed from the furnace and quenched into oil. After the material cooled to approximately 150° F., it would be removed from the quench bath. The alloy would then be tempered for approximately two hours at a temperature of less than 1320° F. For maximum hardness and strength, the alloy would be tempered at or below 350° F. However, if toughness was important, a tempering temperature of 1150° F. would be selected. For a bearing alloy such as AISI 52100, the austenitizing may be 1525° F. After quenching, a tempering temperature of approximately 350° F. would be used. Low temperature tempering would be used for any bearing fabricated from an alloy steel. This would ensure that the resulting component would be hard and have as high a compressive yield stress as possible. Tempering temperatures exceeding 350° F. will lower the hardness and, consequently, the compressive yield stress of bearings made from through hardened steels.

For all alloy steels, after being austenitized and then oil quenched, increasing the tempering temperature is found to decrease the alloy's hardness. Steels having this type of tempering response are referred to as "class 1" types of steels, depicted in FIG. 1.

The heat treating procedures used for high speed steels typically begin with a preheat of approximately 1450° F. to 1550° F. Components fabricated from HSS are equilibrated at the preheating temperature for at least one hour. Following the preheat, high speed steel alloys are then quickly placed in an austenitizing furnace that is at a higher temperature. Depending on the alloy, the high austenitizing temperature may range from 2000° F. to 2125° F. The HSS components are only held at the austenitizing temperature for a brief amount of time, say, 3 to 10 minutes. Following austenitization, the material is quenched into a salt bath at 1000° F. After equilibrating in the salt bath, the components are allowed to air cool to at least 150° F. If an oil quench is employed, the material should be removed when it reaches 900° F., after which, cooling to 150° F. in still air is recommended.

Following quenching, high speed steel alloys contain untempered martensite, alloy carbides and retained austenite. Tempering HSS must accomplish two things. The martensite needs to be tempered, and the retained austenite has to be transformed to martensite. The general procedure employed for tempering high speed steels is to heat the alloys to approximately 1000° F. for two hours and then air cool to room temperature. The cycle is then repeated one more time. Most high speed steels show "class 3" tempering response, of the type depicted in FIG. 1. When the appropriate tempering temperature is found, the hardness after the tempering cycles is actually greater than the hardness immediately after quenching for HSS alloys.

The material and chemical transformations occurring during the heat treating of high speed steels are much more complex than the transformations that occur in alloy steels. A typical HSS alloy contains from 0.80% to 1.40% carbon. In addition, up to 25% alloy elements may be present. The primary alloying elements are typically a combination of Cr, Mo, V and W. Lesser amounts of Co, Si and Cb may occasionally be present. After these alloys are cast, hot rolled and then annealed, the microstructure consists of low carbon iron, ferrite and a large volume fraction of alloy carbides.

The alloy carbides in high speed steels are generally composed of a combination of alloy elements and carbon; hence, the designation $M_xC_y$ is used. M represents a metal atom and C designates carbon. X corresponds to the number of metal atoms in the carbide and Y is the number of carbon atoms, respectively. Typical carbides in the annealed high speed steels are MC, $M_6C$ and $M_{23}C_6$ types.

When the annealed alloy is preheated to 1550° F., the ferrite transforms to austenite, and some of the alloy carbide may dissolve. When the steel is placed in the austenitizing furnace where the temperature is 2050° F. or greater, all the $M_{23}C_6$ dissolved. As much as 50% of the $M_6C$ and the MC may dissolve at the high austenitizing temperature. As the carbides dissolve, the carbon is dispersed in the austenite matrix. When the alloy is quenched and then cooled to 150° F. or less, most of the high carbon austenite transforms to martensite. Some of the austenite is retained, and the carbides that did not dissolve remain. The carbides present are MC and $M_6C$ types. At this stage in heat treating, the hardness of the alloy is high. Depending on the total alloy content, the hardness often exceeds 60 HRC (732 KHN).

Tempering high speed steels to temperatures up to 800° F. may slightly decrease the hardness of the alloy. However, tempering temperatures near 1000° F. increase the hardness of these (class 3) steels, FIG. 1. This phenomenon is referred to as secondary hardening. Two processes are occurring in this temperature range: (1) retained austenite is transformed to martensite; and (2) very small alloy carbides such as $Mo_2C$, $W_2C$ and VC are formed.

The high hardness of high speed steels, as well as their resistance to softening at elevated temperatures, is primarily due to the phenomenon of secondary hardening. The formation of the small alloy carbides is primarily responsible for the excellent hot hardness these alloys exhibit.

As increased demands were placed upon bearings used in aircraft engines, M50 high speed steel was selected for applications requiring high temperature service. This alloy achieves its maximum hardness by the phenomenon of secondary hardening. Hence, M50 has good strength at elevated temperatures. The nominal composition of M50 is 0.80% C, 4.10% Cr, 4.25% Mo and 1.00% V. Secondary hardening in this alloy is primarily caused by Mo and V.

The major disadvantage of M50 or other high speed steels is that the relatively high carbon and alloy content of the alloy greatly decreases its fracture resistance or toughness. Considering previous knowledge of the inherent benefits of using carburized components, a low carbon version of M50 was developed. The low carbon variety was named M50 Nil; its nominal composition is: 0.13% C, 4.20% Cr, 3.40% Ni, 4.25% Mo and 1.2% V. The low carbon nickel added variant of M50 has excellent fracture toughness. Furthermore, since carbon is added to the case by a gas metal reaction, the carbides formed during carburizing are smaller than the carbides in wrought M50. The absence of large carbides is beneficial to rolling contact fatigue life.

There is, however, a major disadvantage associated with M50 Nil. Since the alloy contains 4.2% Cr, it is difficult to carburize and, therefore, components fabricated from M50 Nil must be pre-oxidized prior to being carburized. This step creates additional expenses and problems for bearing manufacturers using M50 Nil. Vacuum plasma carburizing can be used on non-oxidized M50 Nil, but this processing is very expensive when compared to standard gas carburizing.

The presence of approximately 4% chromium in most high speed steels may, in part, be the result of early developments with these alloys and their processing. During the preliminary development of these grades of alloys, it was noted that 4% chromium represented the best compromise between hardness and toughness for high speed steels. It should be noted, however, that when compared to alloy steels, the toughness of any HSS is, at best, very poor. While chromium is mainly responsible for the great hardenability of these alloys, this property is only of importance in components having large cross-sectional areas. It is believed that chromium in the matrix increases the difficulty of precipitation and coalescence of the carbide involved in the secondary hardening phenomena. However, chromium alone does not greatly contribute to improvements in hot hardness. In machining tests, less than 4% Cr has shown to decrease cutting efficiency. In the early development of high speed steels, chromium was found to reduce the oxidation and scaling of these alloys during heat treatment. While this factor may have been important in the 1940's, with today's modern furnaces and rectified salt baths, oxidation during heat treating can easily be prevented. It is of even greater interest to consider that the resistance to oxidation caused by chromium was considered beneficial, but this same property is what makes M50 Nil difficult to carburize.

A careful analysis of the benefits that have been achieved in using high speed steels in bearing applications, coupled with a recognition of the limitations experienced by these alloys and M50 Nil, form the genesis of the present invention. Ideally, a bearing alloy for high temperature applications should possess the following properties:

1. high compressive yield stress
2. high hardness
3. high hot hardness
4. excellent toughness
5. ease of manufacturing
6. compressive residual stresses in the case.

SUMMARY OF THE INVENTION

The present invention relates to low carbon high speed steels that can be easily carburized using conventional processes employed for standard alloy steels such as 8620, 8720, 4320 or 3311. This family of alloys contains less carbon than is in a standard grade of high speed steel. Preferably, alloys according to the present invention contain less than 0.40 wt. % carbon. In addition, the chromium content of the alloys is less than 2 wt. % and, more preferably, the chromium content is less than 1.5 wt. %. The low chromium content is a critical factor in enhancing the ease of carburizing these steels. In order to obtain the properties described herein, the sum of one or more of (Mo+V+Co+W), including the Cr content, is equal to or greater than 7.5 wt. % ranging up to 35%. As with all steels, the majority of the alloy is composed of iron. The selection of the alloy elements and their effect on properties are listed below:

TABLE 1

Ability of Various Alloying Elements to Impart
Special Characteristics to Tool and Die Steels

| CHARACTERISTIC | ELEMENTS* |
|---|---|
| Hot hardness | W, Mo, Co (with W or Mo), V, Cr, Mn |
| Wear resistance | V, W, Mo, Cr, Mn |
| Deep hardening | Mn, Mo, Cr, Si, Ni, V** |
| Minimum distortion | Mo (with Cr), Cr, Mn |
| Toughening by grain refinement | V, W, Mo, Mn, Cr |

*Elements are arranged roughly in order of decreasing potency when added in usual amounts for the characteristic desired.
**Provides deep hardening if austenitized at high enough temperature to dissolve vanadium carbide.

The present invention also is directed to a method for making a modified high speed steel possessing a surface hardness of 60 HRC or greater, containing less than 10% retained austenite and a fracture resistant core. The method comprises the steps of:

(a) providing an alloy consisting essentially of in % by weight up to 0.4 wt. % C, less than 2% Cr, one or more alloy constituents selected from the group consisting of W, Mo, Co, V in an aggregate amount including the Cr content of at least 7.5% up to about 25 or 35%, 0.10–0.60% Mn, 0.03 max % P, 0.15–0.65% Si, up to 2% Ni, and balance Fe plus incidental impurities;

(b) subjecting the steel to a carburizing treatment at approximately 960° C. without any oxidation treatment or heat treatment prior to the carburizing treatment;

(c) quenching the carburized steel;

(d) preheating the quenched carburized steel to 870° C., and then austenitizing the steel at temperatures ranging from 1125° C. to 1225° C.;

(e) quenching the austenitized steel; and (f) tempering the quenched, austenitized steel, preferably twice, at temperatures up to 550° C. followed by air cooling after each tempering treatment.

While the preliminary development of this invention was intended for bearing applications, many other applications are envisioned. For example, taps made from conventional high speed steels are easily broken if too much force is applied to them. A tap made from a carburized HSS possesses much better toughness and fracture resistance than similar high carbon taps.

The surface carbon content of the alloys of the present invention is controlled by the carburizing atmosphere. It is relatively simple to obtain high carbon contents (e.g., up to 1% carbon) on the carburized surface of cutting tools made from the alloys of the present invention. Higher carbon contents make the cutting tools more wear resistant, and the overall toughness of these tools is excellent. Generally, steels with through carbon contents in excess of 1% are very difficult to manufacture in a steel mill. Such high carbon content steels tend to crack after solidifying and are extremely difficult to re-heat and forge or roll.

Since the majority of carbides in the alloys of the invention are formed during carburizing, the overall carbide size distribution is smaller than the carbides in a similar wrought alloy. Furthermore, the number of carbides present prior to carburizing is lower than in a high carbon alloy. Hence, the family of steels of the present invention is easier to machine than standard HSS. The absence of the high volume fraction of carbides provides another advantage to these grades of steels. Higher levels of Mn and S can also be incorporated into these inventive alloys so as to further enhance the machinability of these steels. The following detailed description shows how some selected alloy compositions within the scope of the invention respond to carburizing and heat treating. The accompanying data exemplify the superior physical properties achieved thereby.

A complete understanding of the invention will be obtained from the following description when taken in connection with the accompanying drawing figures.

DETAILED DESCRIPTION OF THE INVENTION

Figure 22:
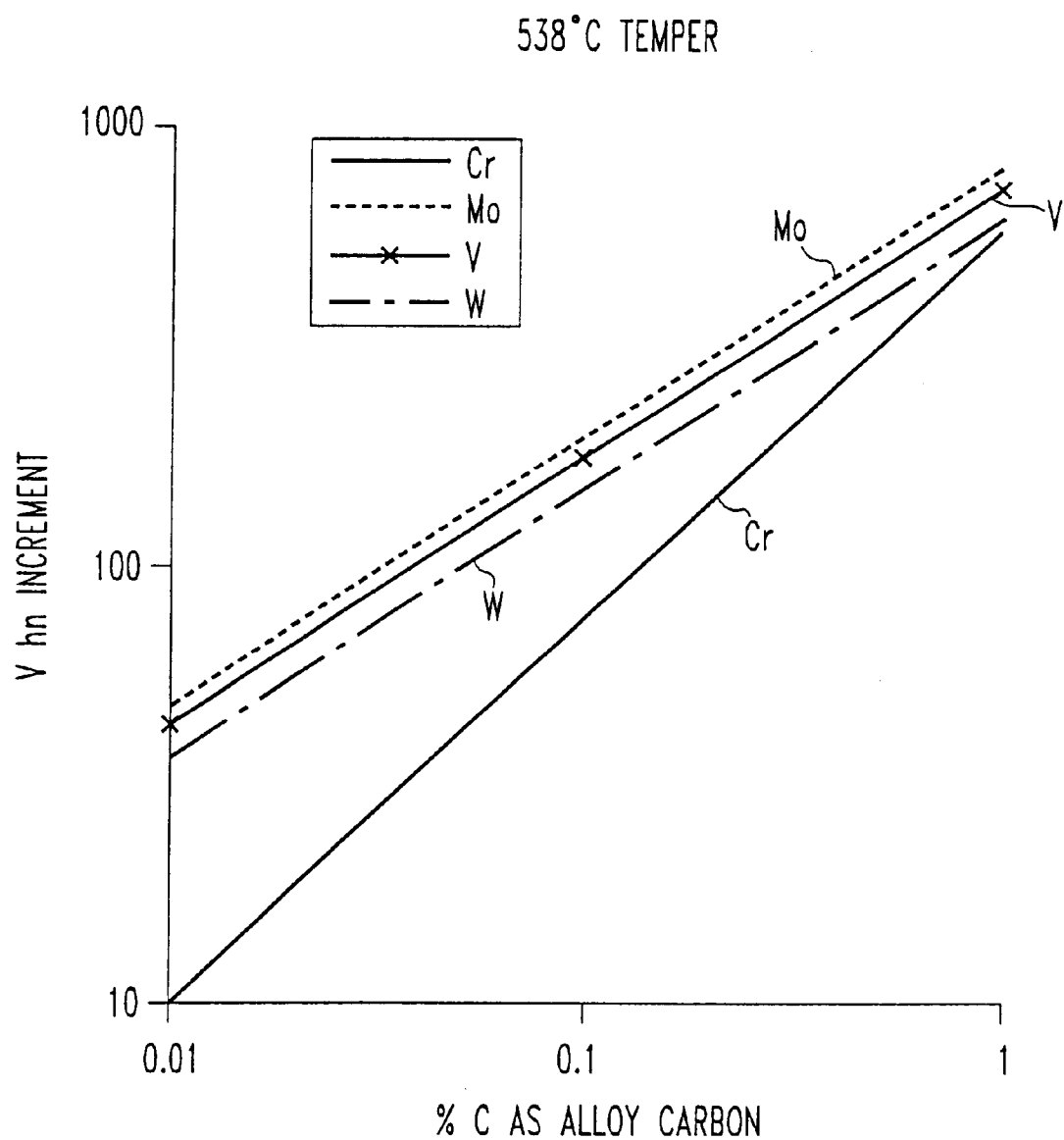
FIG. 22 is a graph of incremental Vickers Hardness vs. % C as alloy carbon for Mo, V, W and Cr.

The present invention relates to low carbon high speed steels that can be easily carburized using conventional processes employed for standard alloy steels such as 8620, 8720, 4320 or 3311. The family of alloys according to the present invention contains less carbon than is present in a standard grade of high speed steel. In addition, the chromium content of the inventive alloys is less than 3% and, more preferably, less than 2%. The low chromium content is a critical factor in enhancing the ease and decreasing the expense of carburizing these steels. The principal alloy elements in the present steels are Mo, V, W and Cr. Other alloy elements may include Co, Si and Nb. The effect that Cr, Mo, V and W have on secondary hardening was carefully documented by Crafts and Lemont in 1949, FIG. 22. As indicated, incremental increases in Cr have a greater effect on hardness during tempering at 1000° F. than Mo, V or W. Hence, if Cr is removed from these steels, to achieve the same hardness after tempering, increased amounts of Mo, V or W are required. The effects represented in FIG. 22 can be expressed by the following equations:

$$\text{Vickers Increment (Cr)} = 550 \ \{\%C^{0.8702}\} \quad (1)$$

$$\text{Vickers Increment (Mo)} = 764 \ \{\%C^{0.6037}\} \quad (2)$$

$$\text{Vickers Increment (V)} = 678 \ \{\%C^{0.5974}\} \quad (3)$$

$$\text{Vickers Increment (W)} = 584 \ \{\%C^{0.6039}\} \quad (4)$$

As an example, for Alloy M1, the nominal Cr content is 3.75%. If the chromium content is lowered to 1.50%, this means that 2.25% chromium that was used to form alloy carbides has been removed. According to Crafts and Lemont, the chromium forms $Cr_7C_3$ carbides. $Cr_3C_7$ contains 19% carbon by weight. The $Cr_3C_7$ that was removed contained 0.43% C. This causes a decrease in the hardness of the alloy as described by equation 1. The hardness reduction is:

$$\text{Vickers Increment (Cr)} = 550 \ \{\%C^{0.8702}\}$$

$$\text{Vickers Increment (Cr)} = 550 \ \{0.43^{0.8702}\} = 263.9.$$

If W is added to the alloy to restore the hardness that was lost by the removal of Cr, then the amount of W necessary is calculated by using equation 4:

$$\text{Vickers Increment (W)} = 584 \ \{\%C^{0.6039}\}$$

$$263.9 = 584 \ \{\%C^{0.6039}\}$$

%C=0.27% for W carbides in the form of $W_2C$. Since 1% of W requires 0.033% C by weight to form $W_2C$, this means 8.18% W must be added to the alloy to restore the hardness to the original value. Similarly, if Mo is used to replace the Cr, then 3.09% Mo is needed to counteract the removal of Cr. Based on equation 3, only 1.40% V is required to compensate for the removal of the Cr.

It is quite possible that other, more complex carbides are contained in these alloys besides the ones discussed. However, these equations serve as basic guides in evaluating the reductions in secondary hardening caused by the removal of chromium and enhancements in secondary hardening caused by the additions of Mo, V and W, or combinations of these alloys. The equations show V to be the most potent alloy constituent for increased secondary hardness followed by Mo and W, respectively.

The nominal compositions of M grades (molybdenum types) of high speed steels as well as T15, a common tungsten grade made by Latrobe Steel Company, are contained in Table 2. The conventional compositional limits for these HSS grades are established by ASTM Standard A600, which are set forth in Table 2A. For comparative purposes, the maximum amounts of the primary alloys for both the M grades and T15 are listed. The sums of the total alloying elements for each grade have been calculated for these alloys.

TABLE 2

Nominal Composition of Several Latrobe Steel Alloys

| Alloy | Cr | Mo | V | W | Co | Sum |
|---|---|---|---|---|---|---|
| M1 | 3.75 | 8.70 | 1.175 | 1.75 | 0 | 14.90 |
| M2 | 4.125 | 5.00 | 1.97 | 6.125 | 0 | 17.35 |
| M3 | 4.125 | 5.125 | 3.00 | 5.875 | 0 | 18.10 |
| M4 | 4.25 | 4.875 | 4.125 | 5.50 | 0 | 18.50 |
| M7 | 3.75 | 8.70 | 2.125 | 1.75 | 0 | 16.25 |
| M42 | 3.875 | 9.50 | 1.12 | 1.50 | 8.00 | 23.85 |
| M50 | 4.125 | 4.325 | 1.03 | 0 | 0 | 9.35 |
| T15 | 4.375 | 0 | 4.875 | 12.50 | 5.00 | 26.50 |
| Maximum of T15 | 5.00 | 0 | 5.25 | 13.00 | 5.25 | 26.50 |
| Maximum of M Grades | 4.75 | 10.0 | 4.00 | 6.30 | 8.00 | 23.85 |

Consider a 1% chromium variation of the following high speed steels, M50, M1 and M2. For Alloy M50, using the compositional ranges listed in ASTM A600, the nominal chromium content is 4.25%. When the nominal chromium content of M50 is reduced to 1%, 3.25% chromium is removed from the alloy. Assuming that all of this chromium is in the form of $Cr_7C_3$ alloy carbide, on a weight fraction basis, removing this amount of chromium removes 0.82% of carbon that would be contained in chromium carbides. By employing equation 1, a decrease in Vickers hardness of 463

HV would be expected. If Mo is added to compensate for this reduction in hardness, equation 2 indicates that an additional 7.28% Mo would be required. Similarly, to account for the hardness decrease caused by the removal of chromium, 3.52% vanadium would be required as per equation 3. Thus, the new maximum alloy content for these elements in a modified M50 HSS according to the present invention would become Mo=12.0% and V=4.75%. The maximum values for the alloying constituents Mo, V and W are calculated using equations (1), (2) and (3), respectively, and the calculated value is then added to the maximum value for that constituent found in ASTM A600, of Table 2A.

Similarly, based upon ASTM A600, the maximum Cr content of M1 HSS is 4.00%. Reducing the Cr content of M1 to 1.0% means that 3% Cr that was used to form alloy carbides has been removed. By analysis, similar to that described for M50, the Mo content of the Modified M1 would have to be increased by 6.1%. The increase in V would be 2.81% and the increase in W, from equation 4, would be 16.5%. Similar analysis for M2 HSS indicates that for a Cr content of 1%, corresponding increases in the contents of Mo, V and W would be 7.54%, 3.52% and 21.1%, respectively.

In the above examples, the effect of only one alloy addition per calculation was considered. As such, this establishes the maximums for each of the alloy elements considered in this invention. In practice, the hardness decrease caused by the removal of chromium would be made up by increasing more than just one alloy element. Hence, the actual compositions of these steels would rarely have the maximum amount of alloying element cited in the compositions.

Based on these examples, according to the invention, the elemental sum of alloy elements consisting of (%Cr+%Mo+%V+%W+%Co) is less than or equal to 35% by weight.

The alloys of the present invention achieve high surface and near surface hardness by the combined effect of two phenomena. First, carburizing the steels increases the surface and near surface carbon content of the alloy and correspondingly increases hardness. Second, a high temperature austenitizing process that can range from 1115° C. through 1215° C. followed by tempering in the preferred range of 450° C. to 550° C. allows the secondary hardening phenomena to occur. As a result of the processing, the retained austenite on and near the surface of these alloys is less than 10%; generally lower than 5%, and the hardness is 60 HRC or greater. For standard high speed steels containing 0.80% C or greater and 3.75% Cr or greater, often a sub-zero chill is employed after quenching the steel or after the first tempering treatment. The purpose of this sub-zero chill is to assist in transforming retained austenite to martensite. For the alloys described in this invention, sub-zero chilling is not required. The processing allows high compressive residual surface stresses to develop. A nominal nickel content of approximately 2% enhances the toughness of these allows.

Figure 7:
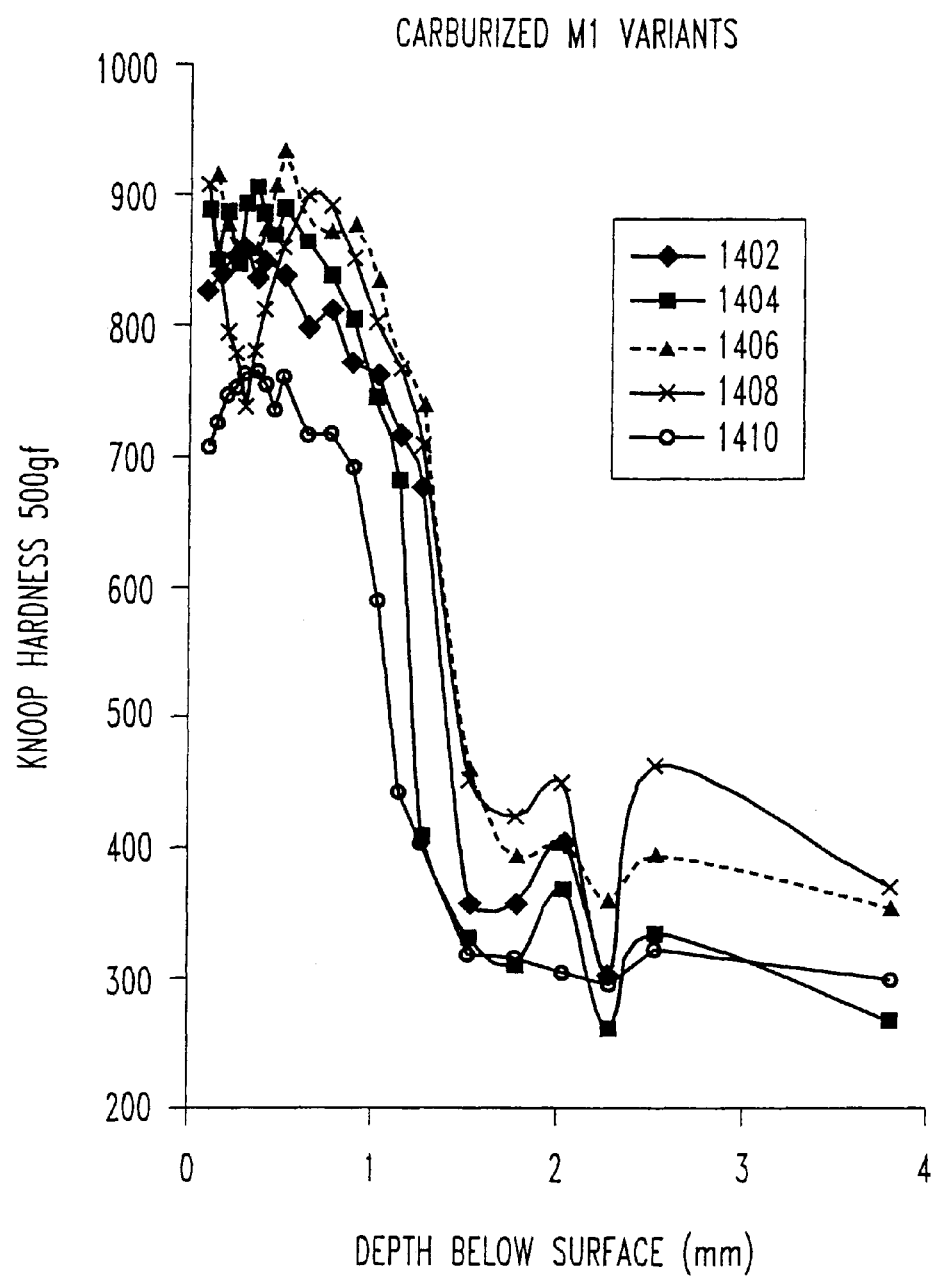
FIG. 7 is a graph showing hardness vs. depth below the surface for a number of carburized M1 alloy variants.

To achieve hardness levels greater than 60 HRC, the standard high speed steels containing 0.80% carbon or higher have compositions that have the sum of (Cr+Mo+W+V) ranging from 9.35% to as high as 21.5%, Table 2. When cobalt is also considered, the compositional range for these five elements is 9.35% through 26.5%, Table 2. The sum of (Cr+Mo+V+W) for the steels of the present invention considered in Example 1, below, ranges from approximately 7.5% (Heat 1320) through 13% (Heat 1323). Similarly for the steels in Example 2, the alloy content for these four elements ranges from 7.9% to 9.7%, and the compositional range for the alloys illustrated by FIG. 7 is 11.2% to 15.3%. As illustrated by these examples, in order to achieve the properties described in this invention, the minimum elemental sum of (Cr+Mo+V+W) is about approximately 7.5 wt. %. In practicing the present invention, one or more alloy constituents selected from the group consisting of W, Mo, Co, V in an aggregate amount including the Cr content should reside within the range of between 7.5–35 wt. %, and more preferably, between 7.5–30 wt. %, and still more preferably, between 7.5–25 wt. %.

TABLE 2A

Chemical Requirements %[1]
ASTM A600

| HSS Type | Carbon min–max | Manganese min–max | Phosphorus max | Sulfur[2] max | Silicon min–max | Chromium min–max | Vanadium min–max | Tungsten min–max | Molybdenum min–max | Cobalt min–max |
|---|---|---|---|---|---|---|---|---|---|---|
| Tungsten-Type High-Speed Steels | | | | | | | | | | |
| T1 | 0.65–0.80 | 0.10–0.40 | 0.03 | 0.03 | 0.20–0.40 | 3.75–4.50 | 0.90–1.30 | 17.25–18.75 | . . . – . . . | . . . – . . . |
| T2 | 0.80–0.90 | 0.20–0.40 | 0.03 | 0.03 | 0.20–0.40 | 3.75–4.50 | 1.80–2.40 | 17.50–19.00 | . . . –1.00 | . . . – . . . |
| T4 | 0.70–0.80 | 0.10–0.40 | 0.03 | 0.03 | 0.20–0.40 | 3.75–4.50 | 0.80–1.20 | 17.50–19.00 | 0.40–1.00 | 4.25–5.75 |
| T5 | 0.75–0.85 | 0.20–0.40 | 0.03 | 0.03 | 0.20–0.40 | 3.75–5.00 | 1.80–2.40 | 17.50–19.00 | 0.50–1.25 | 7.00–9.50 |
| T6 | 0.75–0.85 | 0.20–0.40 | 0.03 | 0.03 | 0.20–0.40 | 4.00–4.75 | 1.50–2.10 | 18.50–21.00 | 0.40–1.00 | 11.00–13.00 |
| T8 | 0.75–0.85 | 0.20–0.40 | 0.03 | 0.03 | 0.20–0.40 | 3.75–4.50 | 1.80–2.40 | 13.25–14.75 | 0.40–1.00 | 4.25–5.75 |
| T15 | 1.50–1.60 | 0.15–0.40 | 0.03 | 0.03 | 0.15–0.40 | 3.75–5.00 | 4.50–5.25 | 11.75–13.00 | . . . –1.00 | 4.75–5.25 |
| Molybdenum–Type High–Speed Steels | | | | | | | | | | |
| M1 | 0.78–0.88 | 0.15–0.40 | 0.03 | 0.03 | 0.20–0.50 | 3.50–4.00 | 1.00–1.35 | 1.40–2.10 | 8.20–9.20 | . . . – . . . |
| M2 regular C | 0.78–0.88 | 0.15–0.40 | 0.00 | 0.03 | 0.20–0.45 | 3.75–4.50 | 1.75–2.20 | 5.50–6.75 | 4.50–5.50 | . . . – . . . |
| high C | 0.95–1.05 | 0.15–0.40 | 0.03 | 0.03 | 0.20–0.45 | 3.75–4.50 | 1.75–2.20 | 5.50–6.75 | 4.50–5.50 | . . . – . . . |
| M3 Class 1 | 1.00–1.10 | 0.15–0.40 | 0.03 | 0.03 | 0.20–0.45 | 3.75–4.50 | 2.25–2.75 | 5.00–6.75 | 4.75–6.50 | . . . – . . . |
| Class 2 | 1.15–1.25 | 0.15–0.40 | 0.03 | 0.03 | 0.20–0.45 | 3.75–4.50 | 2.75–3.25 | 5.00–6.75 | 4.75–6.50 | . . . – . . . |
| M4 | 1.25–1.40 | 0.15–0.40 | 0.03 | 0.03 | 0.20–0.45 | 3.75–4.75 | 3.75–4.50 | 5.25–6.50 | 4.25–5.50 | . . . – . . . |
| M6 | 0.75–0.85 | 0.15–0.40 | 0.03 | 0.03 | 0.20–0.45 | 3.75–4.50 | 1.30–1.70 | 3.75–4.75 | 4.50–5.50 | 11.00–13.00 |
| M7 | 0.97–1.05 | 0.15–0.40 | 0.03 | 0.03 | 0.20–0.55 | 3.50–4.00 | 1.75–2.25 | 1.40–2.10 | 8.20–9.20 | . . . – . . . |
| M10 regular C | 0.84–0.94 | 0.10–0.40 | 0.03 | 0.03 | 0.20–0.45 | 3.75–4.50 | 1.80–2.20 | . . . – . . . | 7.75–8.50 | . . . – . . . |
| high C | 0.95–1.05 | 0.10–0.40 | 0.03 | 0.03 | 0.20–0.45 | 3.75–4.50 | 1.80–2.20 | . . . – . . . | 7.75–8.50 | . . . – . . . |
| M30 | 0.75–0.85 | 0.15–0.40 | 0.03 | 0.03 | 0.20–0.45 | 3.50–4.25 | 1.00–1.40 | 1.30–2.30 | 7.75–9.00 | 4.50–5.50 |
| M33 | 0.85–0.92 | 0.15–0.40 | 0.03 | 0.03 | 0.15–0.50 | 3.50–4.00 | 1.00–1.35 | 1.30–2.10 | 9.00–10.00 | 7.75–8.75 |

TABLE 2A-continued

Chemical Requirements %[1]
ASTM A600

| HSS Type | Carbon min–max | Manganese min–max | Phosphorus max | Sulfur[2] max | Silicon min–max | Chromium min–max | Vanadium min–max | Tungsten min–max | Molybdenum min–max | Cobalt min–max |
|---|---|---|---|---|---|---|---|---|---|---|
| M34 | 0.85–0.92 | 0.15–0.40 | 0.03 | 0.03 | 0.20–0.45 | 3.75–4.50 | 1.90–2.30 | 1.40–2.10 | 7.75–9.20 | 7.75–8.75 |
| M36 | 0.80–0.90 | 0.15–0.40 | 0.03 | 0.03 | 0.20–0.45 | 3.75–4.50 | 1.75–2.25 | 5.50–6.50 | 4.50–5.50 | 7.75–8.75 |
| M41 | 1.05–1.15 | 0.20–0.60 | 0.03 | 0.03 | 0.15–0.50 | 3.75–4.50 | 1.75–2.25 | 6.25–7.00 | 3.25–4.25 | 4.75–5.75 |
| M42 | 1.05–1.15 | 0.15–0.40 | 0.03 | 0.03 | 0.15–0.65 | 3.50–4.25 | 0.95–1.35 | 1.15–1.85 | 9.00–10.00 | 7.75–8.75 |
| M43 | 1.15–1.25 | 0.20–0.40 | 0.03 | 0.03 | 0.15–0.65 | 3.50–4.25 | 1.50–1.75 | 2.25–3.00 | 7.50–8.50 | 7.75–8.75 |
| M44 | 1.10–1.20 | 0.20–0.40 | 0.03 | 0.03 | 0.30–0.55 | 4.00–4.75 | 1.85–2.20 | 5.00–5.75 | 6.00–7.00 | 11.00–12.25 |
| M46 | 1.22–1.30 | 0.20–0.40 | 0.03 | 0.03 | 0.40–0.65 | 3.70–4.20 | 3.00–3.30 | 1.90–2.20 | 8.00–8.50 | 7.80–8.80 |
| M47 | 1.05–1.15 | 0.15–0.40 | 0.03 | 0.03 | 0.20–0.45 | 3.50–4.00 | 1.15–1.35 | 1.30–1.80 | 9.25–10.00 | 4.75–5.25 |
| M48 | 1.42–1.52 | 0.15–0.40 | 0.03 | 0.07 | 0.15–0.40 | 3.50–4.00 | 2.75–3.25 | 9.50–10.50 | 4.75–5.50 | 8.00–10.00 |
| M62 | 1.25–1.35 | 0.15–0.40 | 0.03 | 0.07 | 0.15–0.40 | 3.50–4.00 | 1.80–2.10 | 5.756–6.50 | 10.00–11.00 | . . . – . . . |
| Intermediate High–Speed Steels | | | | | | | | | | |
| M50 | 0.78–0.88 | 0.15–0.45 | 0.03 | 0.03 | 0.20–0.60 | 3.75–4.50 | 0.80–1.25 | . . . – . . . | 3.90–4.75 | . . . – . . . |
| M52 | 0.85–0.95 | 0.15–0.45 | 0.03 | 0.03 | 0.20–0.60 | 3.50–4.30 | 1.65–2.25 | 0.75–1.50 | 4.00–4.90 | . . . – . . . |

[1]Chemistry limits include product analysis tolerances. Unless otherwise specified, nickel plus copper equals 0.75% max for all types.
[2]Where specified, sulfur may be 0.06 to 0.15% to improve machinability.

The present invention will now be described with reference to specific examples which will enable a better understanding of the invention.

EXAMPLES

Example 1

A group of four 50-pound laboratory vacuum induction heats of modified low carbon M2 high speed steels were melted and teemed into graphite ingots. The ingots were annealed and rough machined to remove surface defects. The ingots were then cut into three sections of equal height of approximately 2.75 inches. These sections were then heated to 2250° F. and reduced in thickness to approximately 0.675 inches in height by rolling into slabs.

The compositions of the modified alloys according to the invention and the nominal composition of conventional M2 high speed steels are listed below in Table 3.

TABLE 3

Modified M2 Low Carbon Ingots (wt. %)

| HEAT | C | Cr | W | V | Mo |
|---|---|---|---|---|---|
| 1320 | 0.19 | 0.77 | 2.84 | 0.95 | 2.97 |
| 1321 | 0.18 | 0.76 | 2.82 | 0.94 | 4.97 |
| 1322 | 0.19 | 0.72 | 5.60 | 1.02 | 3.35 |
| 1323 | 0.13 | 0.70 | 5.78 | 0.96 | 5.69 |
| M2 | 0.85 | 4.15 | 6.30 | 1.85 | 5.05 |

In addition to low carbon and chromium levels, the Mo content and the W content of these inventive alloys were modified from standard M2 HSS, identified as heats 1320, 1321, 1322 and 1323 in Table 3. Alloys according to the present invention may contain other constituents commonly present in tungsten-type HSS and molybdenum-type HSS as provided for in ASTM Standard A600, namely, (in wt. %) 0.10–0.60 Mn, 0.03 max P, 0.03 max S, 0.15–0.65 Si, (Ni+Cu)=0.75 max, balance Fe plus incidental impurities. The S content may be increased to about 0.06–0.15 to improve machinability.

After being slabbed, the alloys were rough machined, and smaller plates made from alloy heats 1320, 1321, 1322 and 1323 were carburized in a commercial facility. The small plates were placed into a standard carburizing furnace and heated to approximately 1760° F. They experienced a standard commercial 1/16" case carburizing treatment. The furnace atmosphere in the carburizing process is referred to as an endothermic gas having a natural gas enrichment. The gas is typically composed of 40% hydrogen, 40% nitrogen and 20% carbon monoxide. The carbon potential of the gas in the furnace is approximately 1.40% C. The total cycle time including heating is approximately 13 hours. After carburizing, the plates were quenched in oil.

Figure 2:
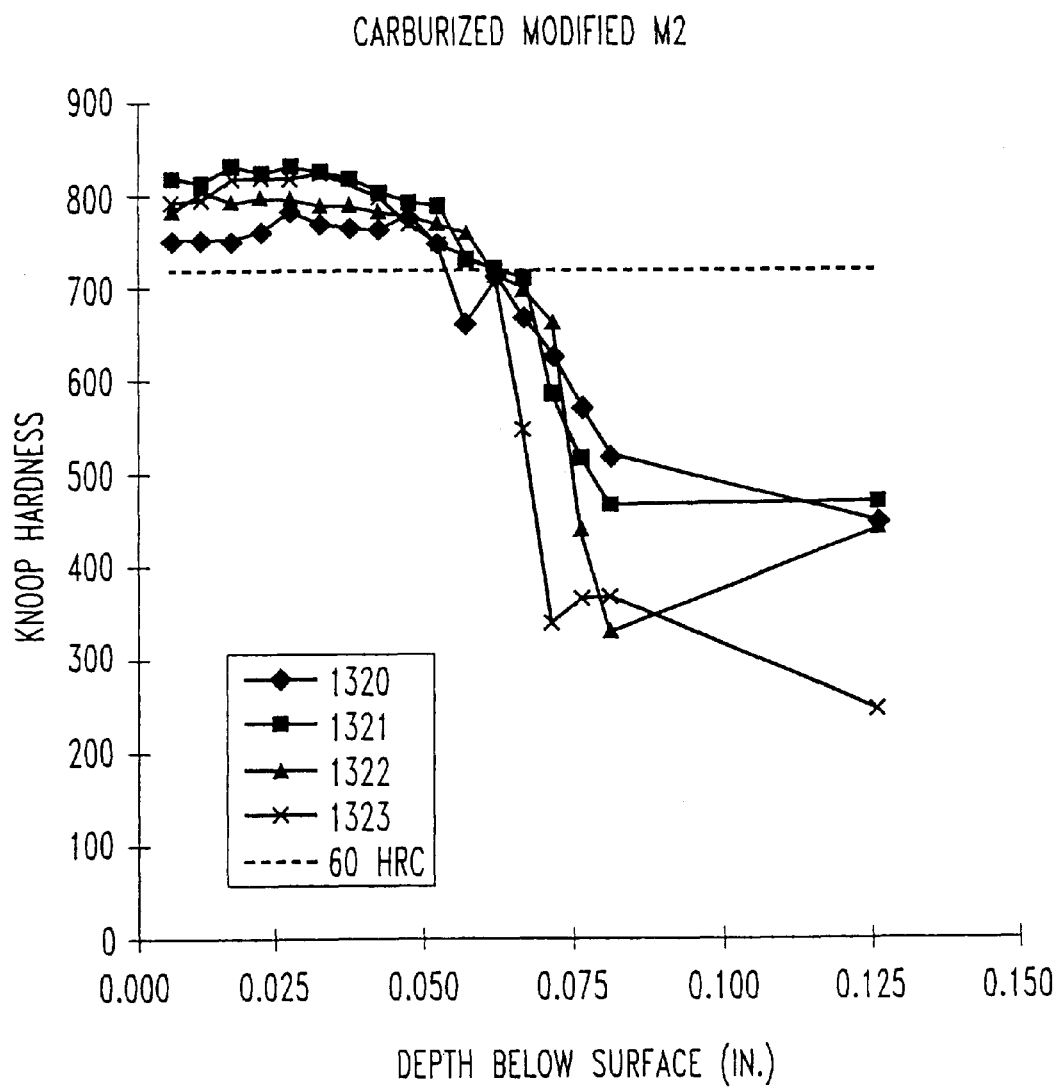
FIG. 2 is a graph showing hardness vs. depth below the surface for carburized, modified M2 high speed steel alloys of the present invention.

Following the oil quench, smaller specimens were cut from the plates. These specimens were heated to 2228° F. and held at temperature for 15 minutes. The specimens were then quenched in oil. Following the quench, the specimens were tempered for two hours at 932° F. and cooled to room temperature. The specimens were then re-tempered at 932° F. for two hours and cooled to room temperature. The specimens were cross-sectioned and prepared for standard metallographic analysis. In addition, a Knoop microindentation hardness ($KHN_{500}$) traverse was performed on each of the specimens, the results of which are depicted graphically in FIG. 2. As indicated, the hardness of the specimens exceeded 60 HRC for at least 0.050" for each specimen. Since the tempering response of these alloys was unknown, 932° F. was an initial estimate of the appropriate tempering temperature.

Figure 3:
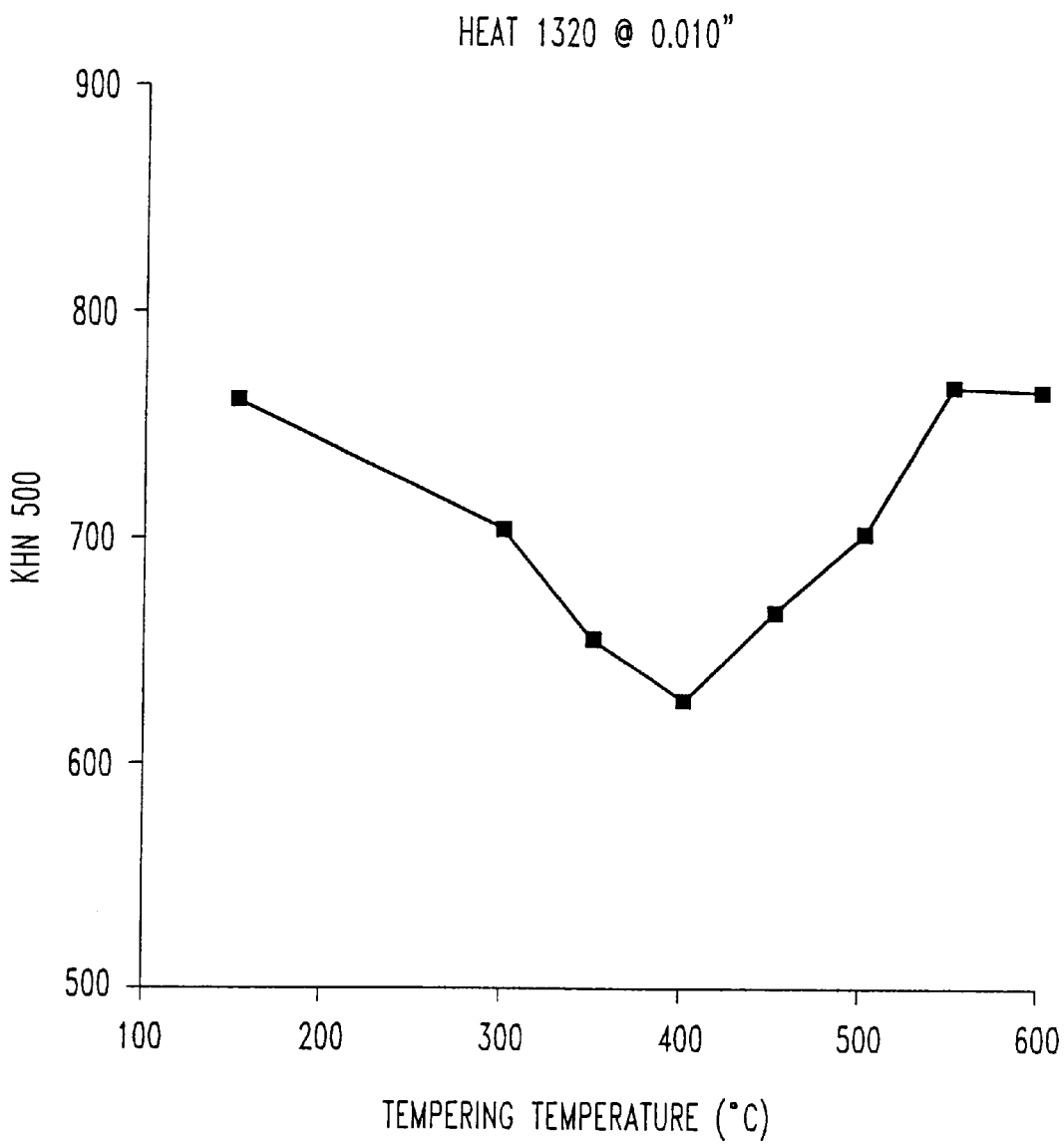
FIG. 3 is a graph showing hardness vs. tempering temperature for heat 1320 of the invention at a case depth of 0.010 inches.

Another group of specimens from each alloy heat was double tempered at temperatures ranging from 302° F. through 1112° F. Data for heat 1320 is represented graphically in FIG. 3. When tempered at 302° F., the hardness of the alloy of heat 1320 is 760 $KHN_{500}$ at a depth of 0.010" below the surface. Hardness measurements were made at 0.010" below the surface to account for any slight variations in surface carbon that may have been present. Since the specimens were carburized, all hardness measurements were taken at the same depth for comparative purposes in evaluating the effects of tempering. As indicated, the hardness of the specimens at first decreases as the tempering temperature is increased up to approximately 752° F. However, for temperatures in excess of 752° F., the hardness begins to increase. A maximum is achieved at 1022° F. for the alloy of heat 1320. These results indicate that this alloy has "class 3" tempering behavior despite the fact that the chromium content is much less than the nominal 4.0% contained in most high speed alloys. The chromium content of this alloy was only 0.77%.

Example 2

Another series of modified M2 low carbon HSS alloys according to the present invention was prepared under conditions similar to those described in Example 1. The compositions of these alloys are set forth in Table 4 below.

TABLE 4

Low Carbon, Low Chromium, M2 HSS
With Varying Amounts Of Vanadium

| HEAT | C | Cr | W | V | Mo |
|------|------|------|------|------|------|
| 1324 | 0.17 | 0.95 | 5.71 | 0.50 | 5.08 |
| 1325 | 0.18 | 1.03 | 5.70 | 1.85 | 5.00 |
| 1326 | 0.21 | 1.04 | 5.91 | 3.88 | 5.01 |
| 1327 | 0.22 | 1.20 | 5.57 | 5.87 | 4.86 |

Figure 1:
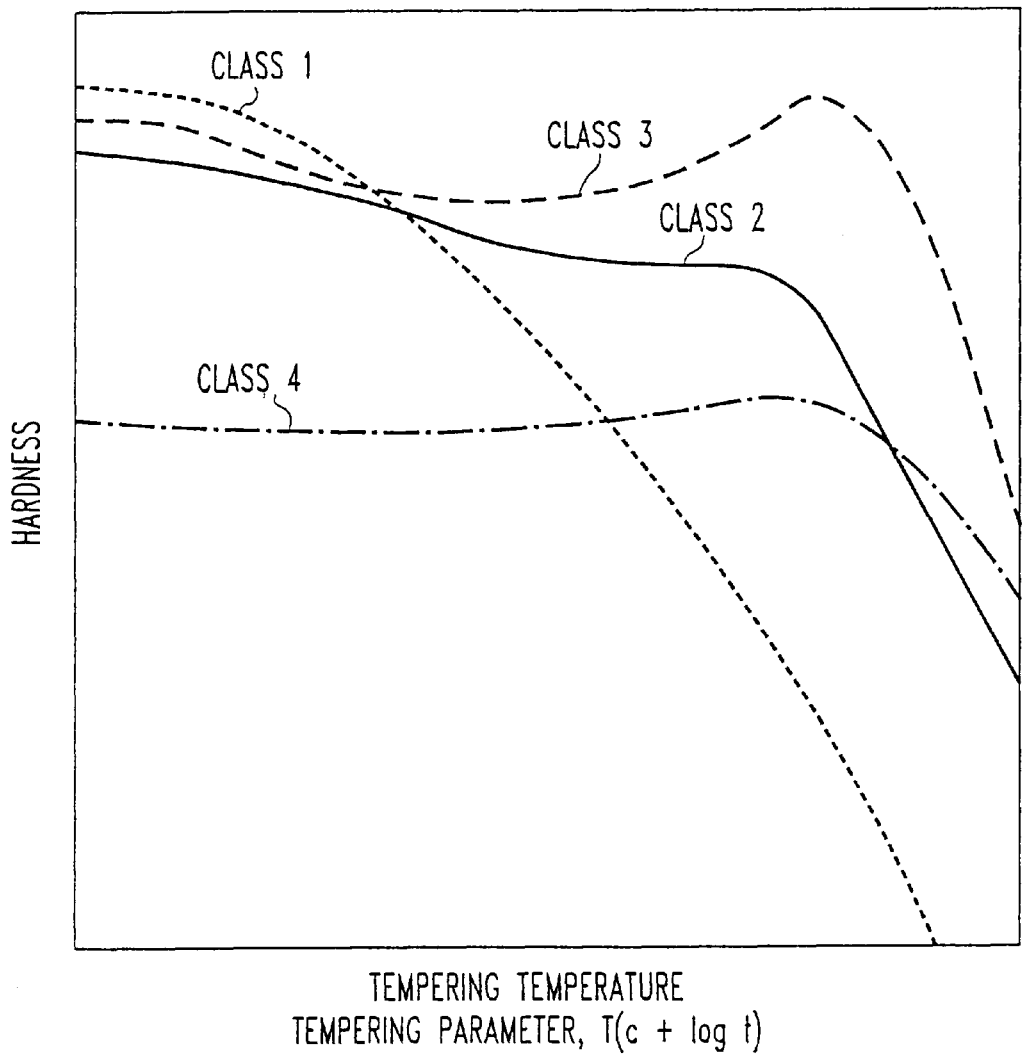
FIG. 1 is a graph of hardness vs. tempering curves for classes of steels.
Figure 4:
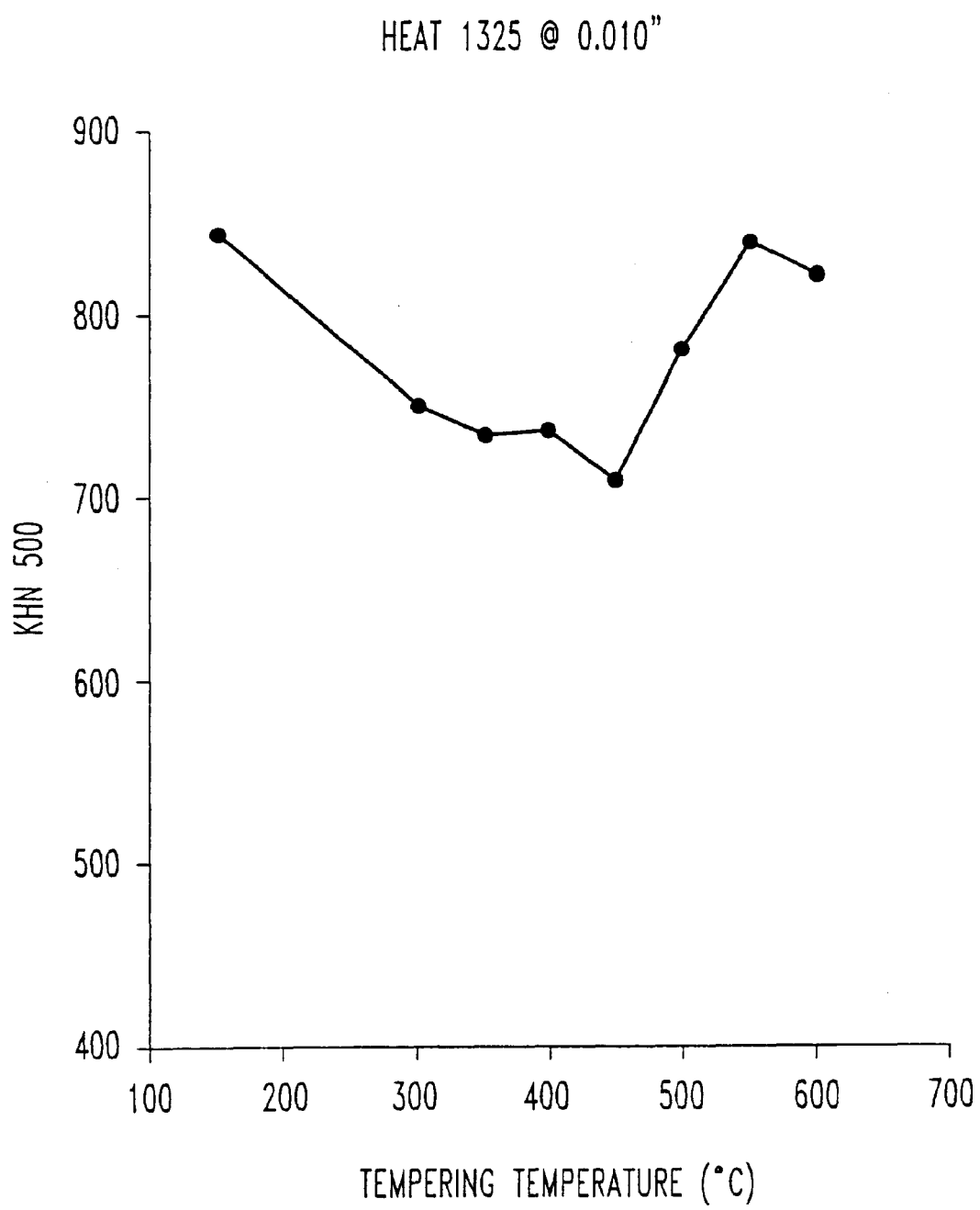
FIG. 4 is a graph similar to FIG. 3 run on heat 1325 of the invention, also at a case depth of 0.010 inches.

After melting, specimens were rolled and prepared for carburizing using the procedures described in Example 1. The second group of specimens was carburized at the same time in the same furnace as those described in Example 1. Heat treating was conducted with the specimens of Example 1. Here again, a similar tempering response was observed. The hardness at a depth of 0.010" below the surface for heat 1325 when double tampered at 302° F. was 844 $KHN_{500}$. As the tempering temperature increased, the dropped to 714 $KHN_{500}$ at 842° F. A maximum in hardness was achieved when was double tempered at 1022° F., 838 $KHN_{500}$, FIG. 4. Here again, the carburized plays the "class 3" tempering response (see FIG. 1).

Figure 5:
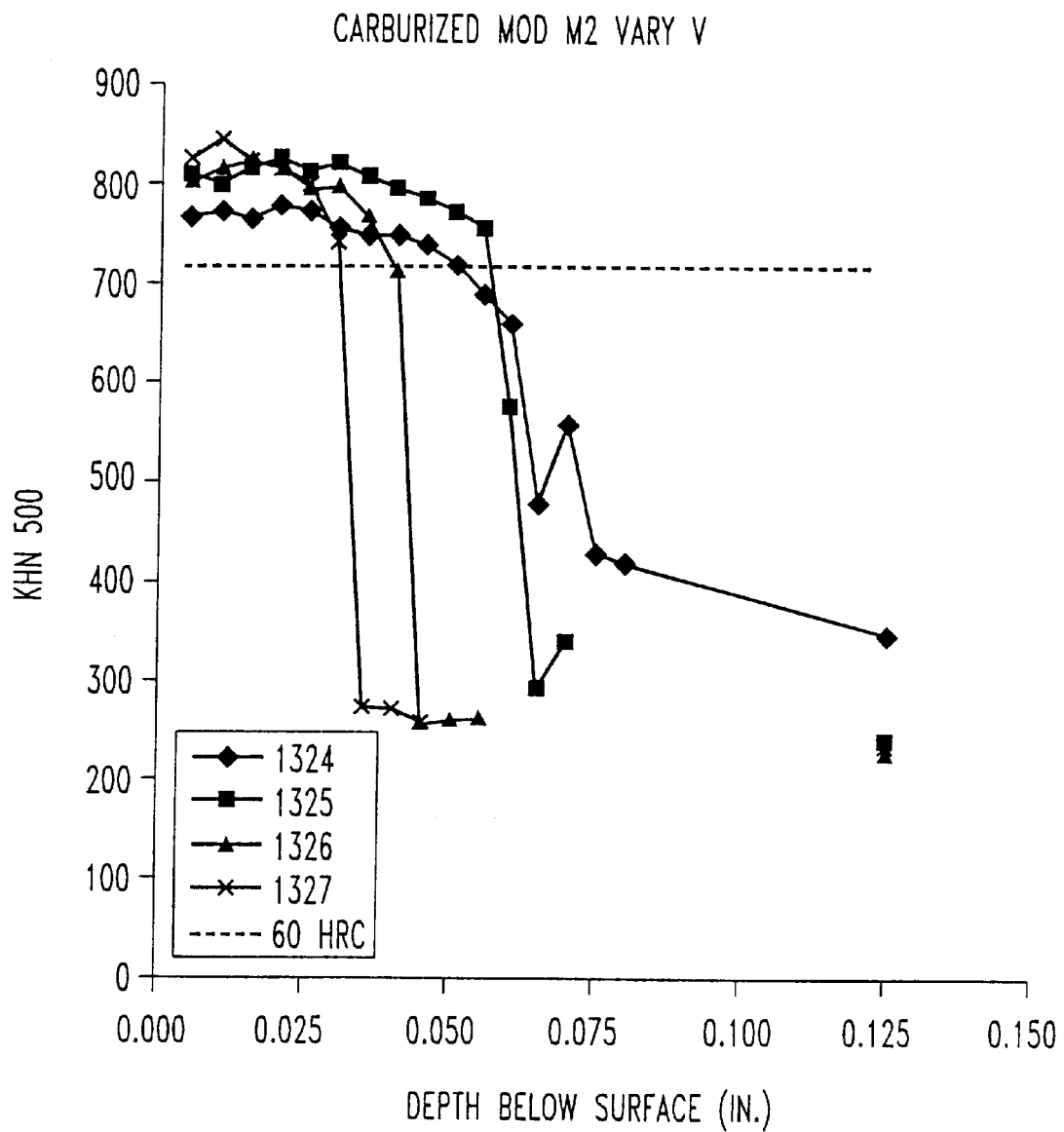
FIG. 5 is a graph showing hardness vs. depth below the surface for a number of heats of carburized, modified M2 variation V alloy of the invention.

It is interesting to note the response of this group of alloys to carburizing. All the alloys have a near surface hardness in excess of 60 HRC. However, as shown in FIG. 5 the higher the vanadium content, the quicker the hardness decreases as the distance from the surface of the specimen is increased. Furthermore, the surface hardness of the alloys is higher with increasing vanadium content of the particular alloy. This indicates that most of the carbon absorbed during carburizing is first forming vanadium carbides and then carbon is being dissolved in the iron austenite phase. Obviously, still higher vanadium content alloys could be made that would have a much more wear-resistant case and still maintain a tough core.

Example 3

Figure 6:
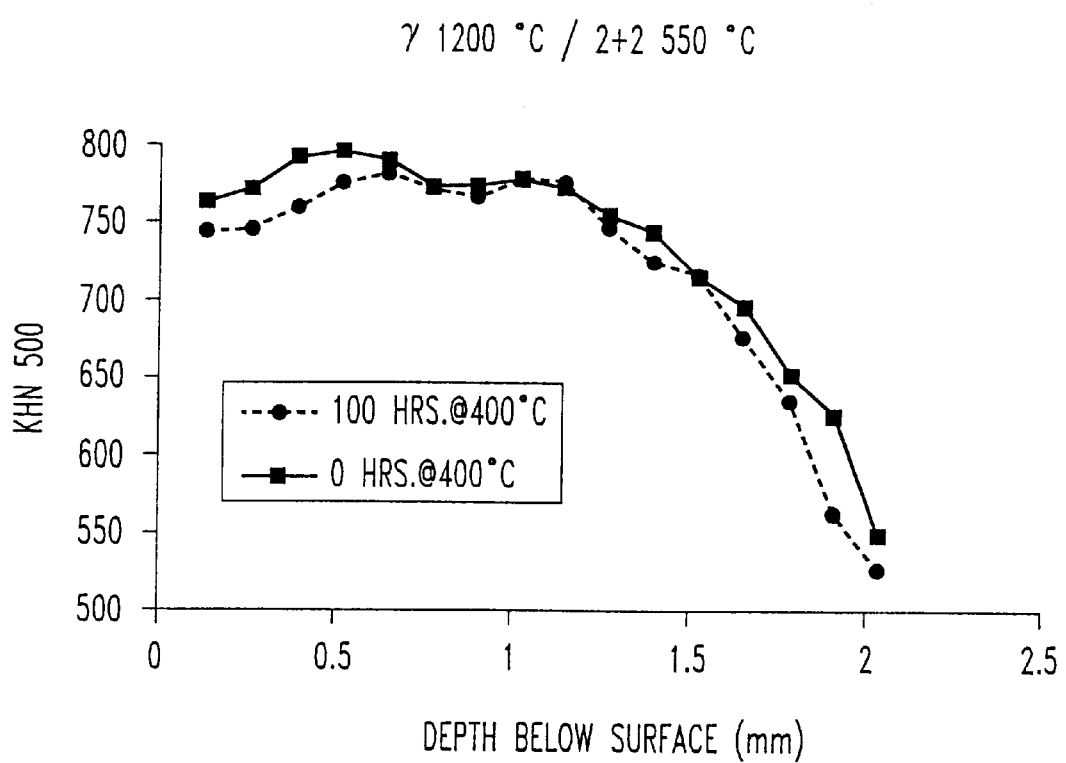
FIG. 6 is a graph showing hardness vs. depth below the surface for alloys of the invention that were double tempered, comparing one alloy that was exposed to 400° C. at 100 hours and one that was not.

Another requirement of bearing alloys is the ability to withstand a high thermal cycle of 662° F. to 932° F. for possible application of various forms of wear-resistant coatings. Generally, high carbon stainless alloys or HSS alloys are used for these applications. The reason for this is that alloy steels and conventional carburizing steels cannot withstand elevated temperatures. The family of alloys within the scope of the present invention can withstand temperatures in these ranges without any appreciable decrease in hardness. The reason for this behavior is as follows. Once these alloys are tempered at, for example, 1022° F., any subsequent thermal treatment at temperatures less than the temperature used to achieve secondary hardening will not affect the microstructure of the alloy. Consider a carburized specimen from inventive heat 1320 of Table 3. After double tempering at 550° C. (1022° F.), a section of this alloy was then heated to 400° C. (752° F.) for 100 hours. After being exposed to this thermal cycle, the hardness as a function of depth below the surface was essentially identical to that of the specimen that was only double tempered, see FIG. 6. Thus, carburized alloys from this invention can successfully withstand the high temperature thermal cycles used in CVD and PVD coating applications as well as other types of thermally applied coatings.

Example 4

A 50-pound heat of steel according to the present invention containing 0.21% carbon, 0.60% Cr and approximately one-half the standard alloy content of M2 HSS was melted. Specifically, the major alloy contents were: W=3.14%, V=0.92% and Mo=2.36%. This steel was teemed into a mold and then hot forged into a bar approximately 1.5" square. From this bar, cylinders having an outside diameter of 1.265", an inside diameter of 0.860" and a height of 1.00" were machined. The machined cylinders were carburized using the procedures similar to those previously described in Example 1 to create a 1/32" case depth. After carburizing, the bars were preheated to 1650° F. and then placed in an austenitizing furnace at 2225° F. for approximately five minutes. The cylinders were removed from the austenitizing furnace and quenched into a salt bath at 1000° F. After equilibrating in the salt bath, the specimens were cooled to room temperature and then double tempered for two hours at 1000° F. The hardness of the surface of the cylinder when tested with a superficial hardness tester was 87 on the 15N scale. This is approximately 51 HRC based on standard conversion tables. The amount of retained austenite (g) within the carburized case and the residual stress pattern within the case are reported in Table 5 below.

TABLE 5

X-Ray Analysis Of The Case For The Salt
Quenched 1: 2 Alloy Modified M2 HSS

| Depth (in.) | Ret. $\gamma$ | Res. Stress (ksi) |
|-------------|---------------|-------------------|
| 0.000 | Nil | −122.6 |
| 0.005 | Nil | −28.2 |
| 0.010 | Nil | −27.2 |
| 0.015 | | −30.8 |
| 0.020 | | −14.9 |
| 0.030 | | −39.5 |

Example 5

A group of 100 pound laboratory vacuum induction heats of modified low carbon M1 HSS with Cr contents greater than 1.0% were processed using procedures similar to those described in earlier examples. These heats were "split". The first 50 pounds of the heat containing low carbon was poured into an ingot. Additional carbon was added to the remaining 50 pounds of steel to create an alloy containing approximately 0.80% carbon. The high carbon alloy was then cast into another ingot, thus creating another 50 pound ingot.

The compositions of the modified alloys and the nominal composition of M1 are listed in Table 6 below.

TABLE 6

Modified Low Carbon M1 Steels

| HEAT | C | Cr | W | V | Mo |
|------|------|------|------|------|------|
| 1402 | 0.04 | 1.01 | 1.41 | 1.22 | 8.50 |
| 1403 | 0.65 | 1.01 | 1.41 | 1.22 | 8.50 |
| 1404 | 0.21 | 2.05 | 1.48 | 1.18 | 8.60 |

TABLE 6-continued

Modified Low Carbon M1 Steels

| HEAT | C | Cr | W | V | Mo |
|---|---|---|---|---|---|
| 1405 | 0.72 | 2.05 | 1.48 | 1.18 | 8.60 |
| 1406 | 0.15 | 3.08 | 1.43 | 1.22 | 8.59 |
| 1407 | 0.73 | 3.08 | 1.43 | 1.22 | 8.59 |
| 1408 | 0.25 | 4.15 | 1.42 | 1.24 | 8.46 |
| 1409 | 0.90 | 4.15 | 1.42 | 1.24 | 8.26 |
| 1410 | 0.15 | 0 | 1.49 | 1.22 | 8.50 |
| 1411 | 0.65 | 0 | 1.49 | 1.22 | 8.50 |
| M1 | 0.85 | 3.75 | 1.50 | 1.15 | 8.50 |

In the above table, other than carbon, the alloy content of the odd numbered heats is identical to the composition of the corresponding even numbered heat. Cylindrical test pieces from these steels were carburized at the Canton bearing factory using standard procedures previously described. The hardness profiles are illustrated in FIG. 7. The maximum hardness of the specimen containing 0.0% Cr, heat 1410, was less than 750 KHN. The specimen containing 1.01% Cr maintained a hardness in excess of 800 KHN a depth of 0.025%. The specimens containing more than 1.01% chromium did not carburize well. The carburized case was very nonuniform and in some instances carburization did not occur.

Figure 8:
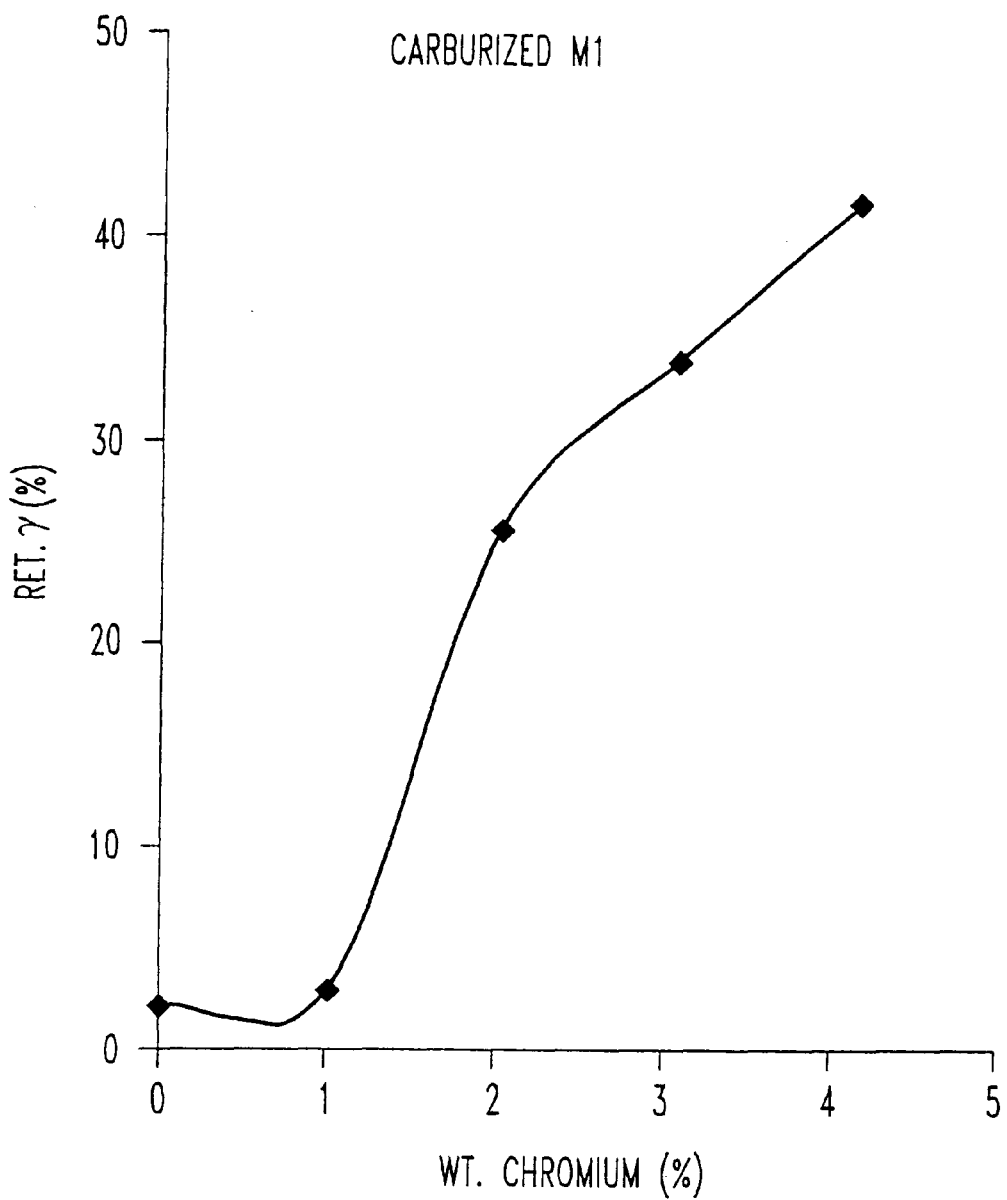
FIG. 8 is a graph showing the amount of retained austenite vs. chromium content in a carburized M1 high speed steel.
Figure 9:
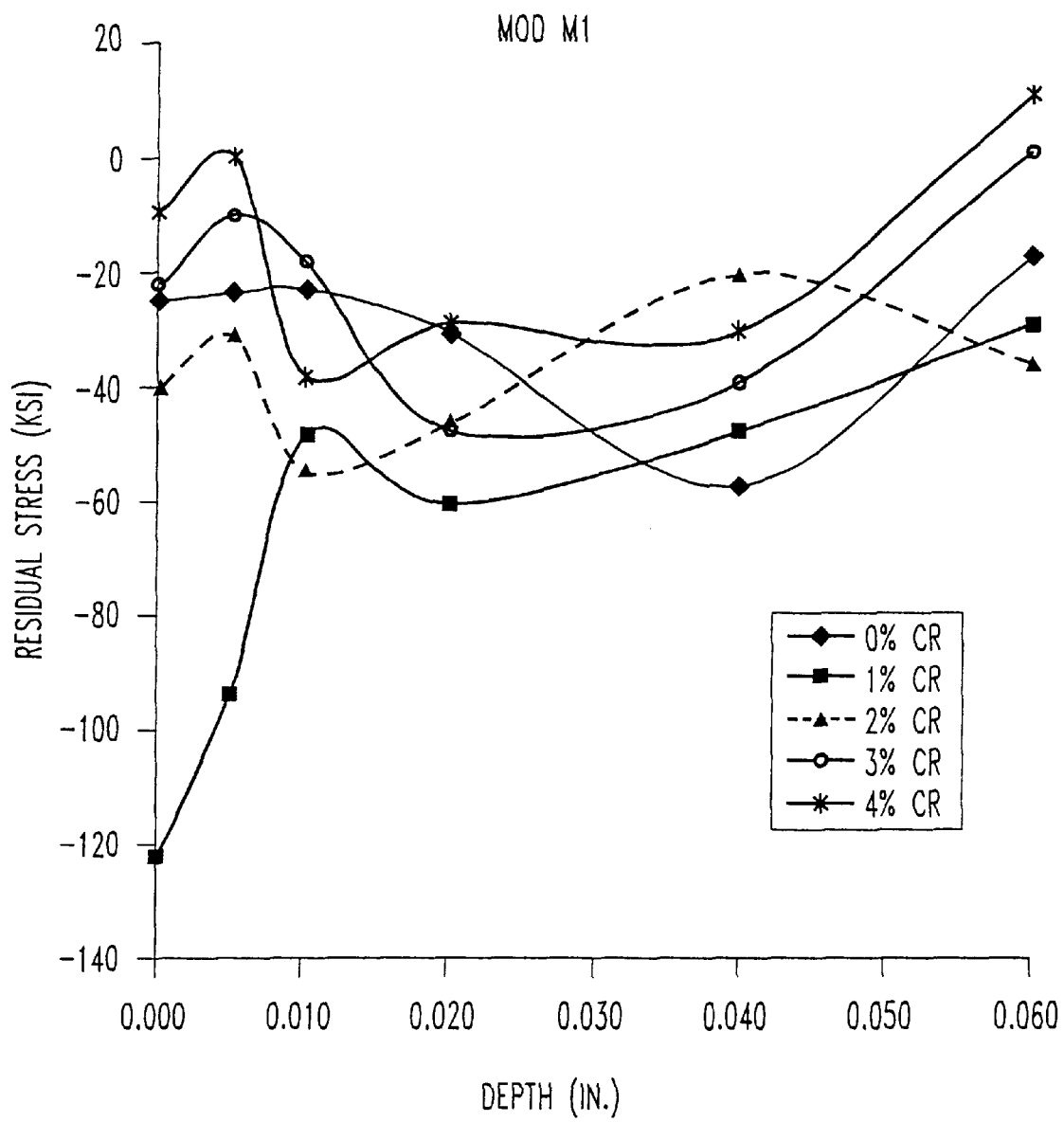
FIG. 9 is a graph showing residual stress vs. depth in a modified M1 alloy showing the effect of Cr.

The amount of retained austenite in these specimens was strongly dependent on the chromium content of the specimens. For chromium contents in excess of 1.01% dramatic increase in the retained austenite was observed, FIG. 8. The effect of chromium on residual stresses is dramatically affected by the chromium content, FIG. 9. The specimen containing 1.01% chromium had a much higher and deeper profile than the other specimens from this group of heats, FIG. 9.

Figure 10:
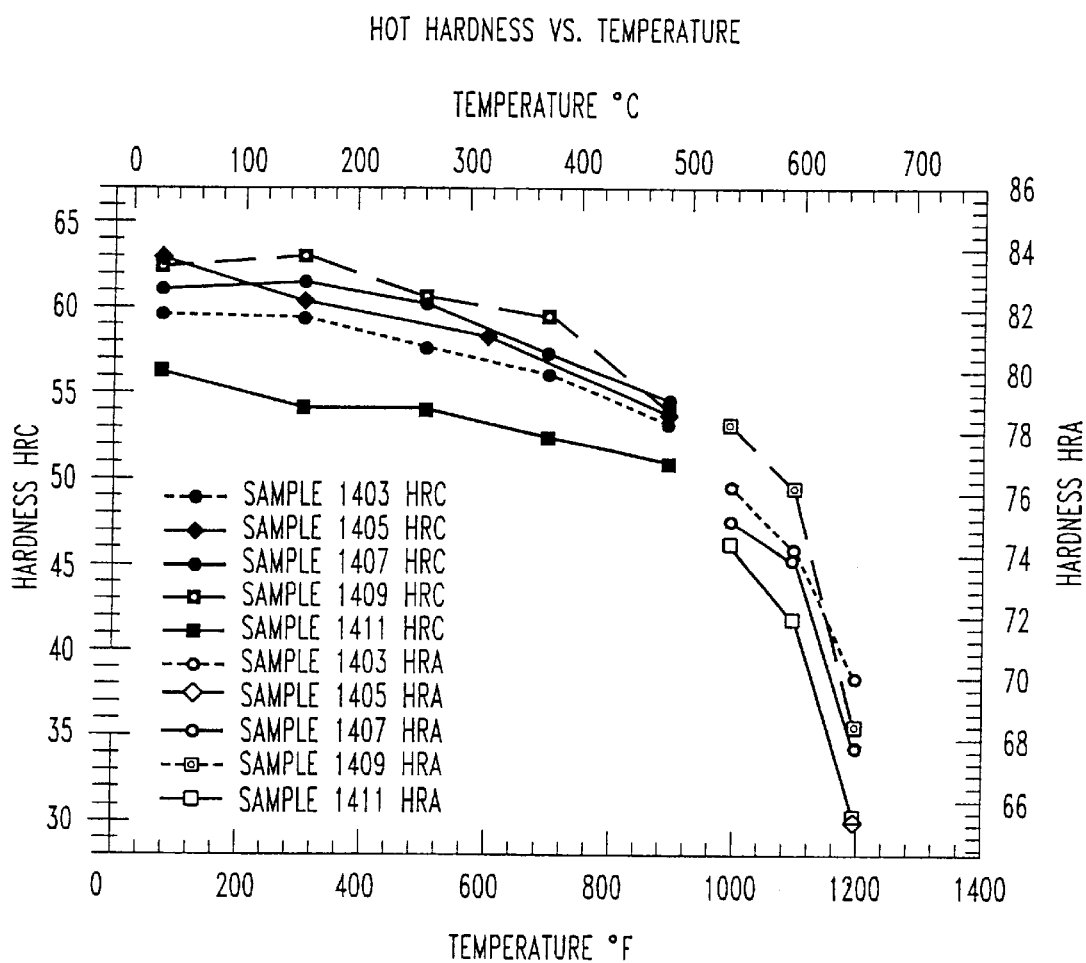
FIG. 10 is a graph showing hardness vs. temperature on a number of high carbon steels.

After hardening and double tempering, hot hardness tests were performed on the high carbon steels, FIG. 10. These results are very similar to those observed for other high speed steels. The hardness gradually declined as the test temperature increases up to approximately 800° F. Then above 800° F., the hardness rapidly decreases as temperature increases, FIG. 10. Specimens of uniform carbon content were used for these tests so that variations in carbon content that would occur in carburized product would not introduce another variable into the testing program. However, since the surface carbon content of carburized components would be approximately 1.00% or slightly greater, the hardness of these alloys for any testing temperature would be increased by 5 to 8 HRC points for temperatures up to 800° F.

Example 6

Another group of modified low carbon M1 high speed steels were produced having the compositions set forth in Table 7 below.

TABLE 7

1% and 1.5% Cr Modified M1 Steels

| HEAT | C | Cr | Ni | Mo | V | W | Fracture Toughness (ksi√in) |
|---|---|---|---|---|---|---|---|
| 1476 | 0.29 | 0.99 | 0.02 | 9.94 | 1.20 | 1.68 | 43.0 |
| 1477 | 0.28 | 0.97 | 1.05 | 8.79 | 1.18 | 1.36 | 43.7 |
| 1478 | 0.70 | 0.86 | 2.05 | 8.95 | 1.24 | 1.20 | |
| 1479 | 0.72 | 0.78 | 3.80 | 8.50 | 1.16 | 0.52 | |
| 1480 | 0.22 | 1.58 | 0.05 | 8.97 | 1.22 | 1.57 | 47.5 |
| 1481 | 0.29 | 1.55 | 1.05 | 8.88 | 1.20 | 1.29 | 41.6 |
| 1482 | 0.28 | 1.56 | 2.04 | 8.94 | 1.24 | 1.04 | 28.7 |
| 1483 | 0.28 | 1.49 | 4.08 | 8.69 | 1.16 | 0.44 | 23.1 |

Figure 11:
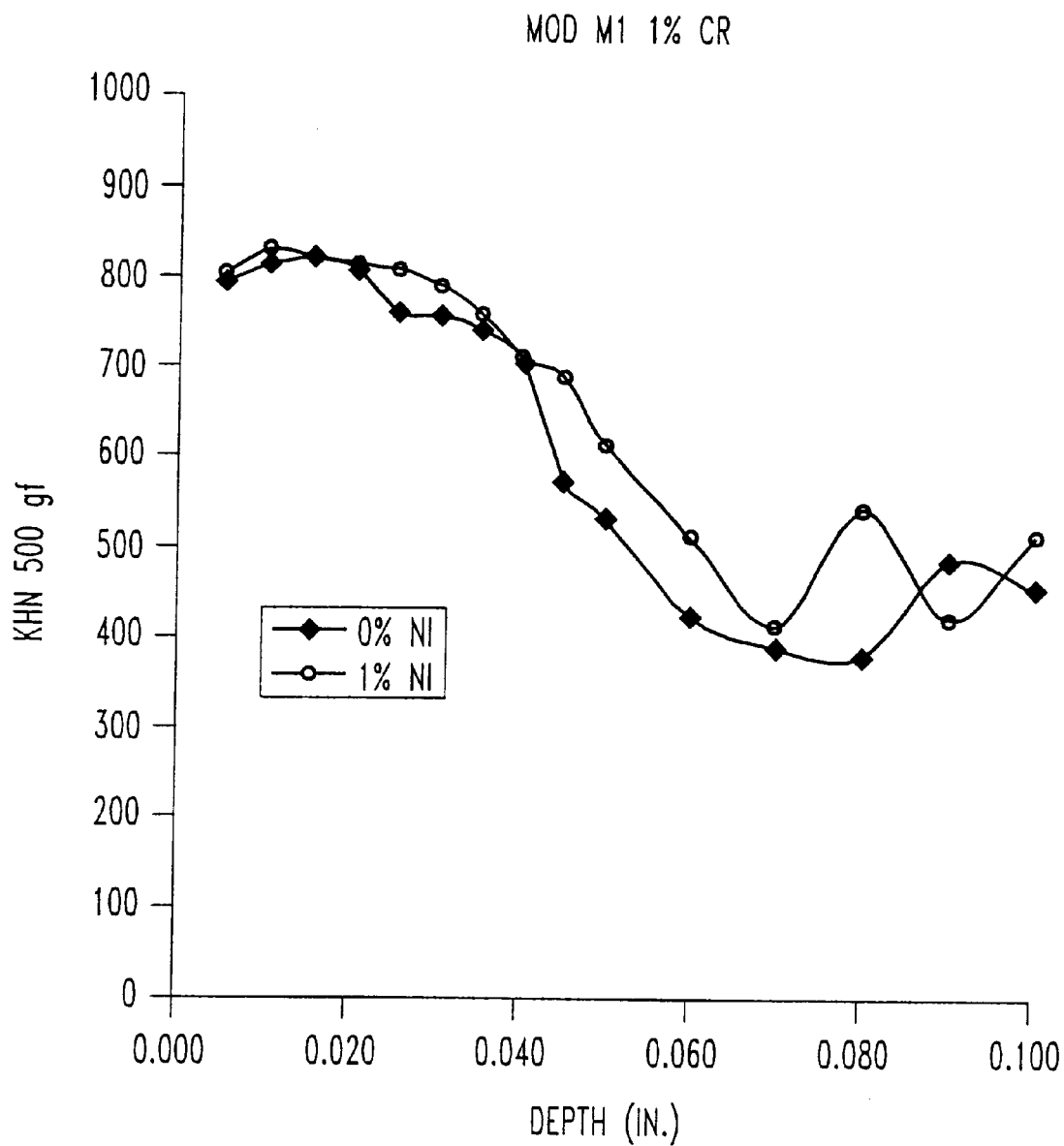
FIG. 11 is a graph showing hardness vs. depth for a modified M1 1% chromium-containing alloy.
Figure 12:
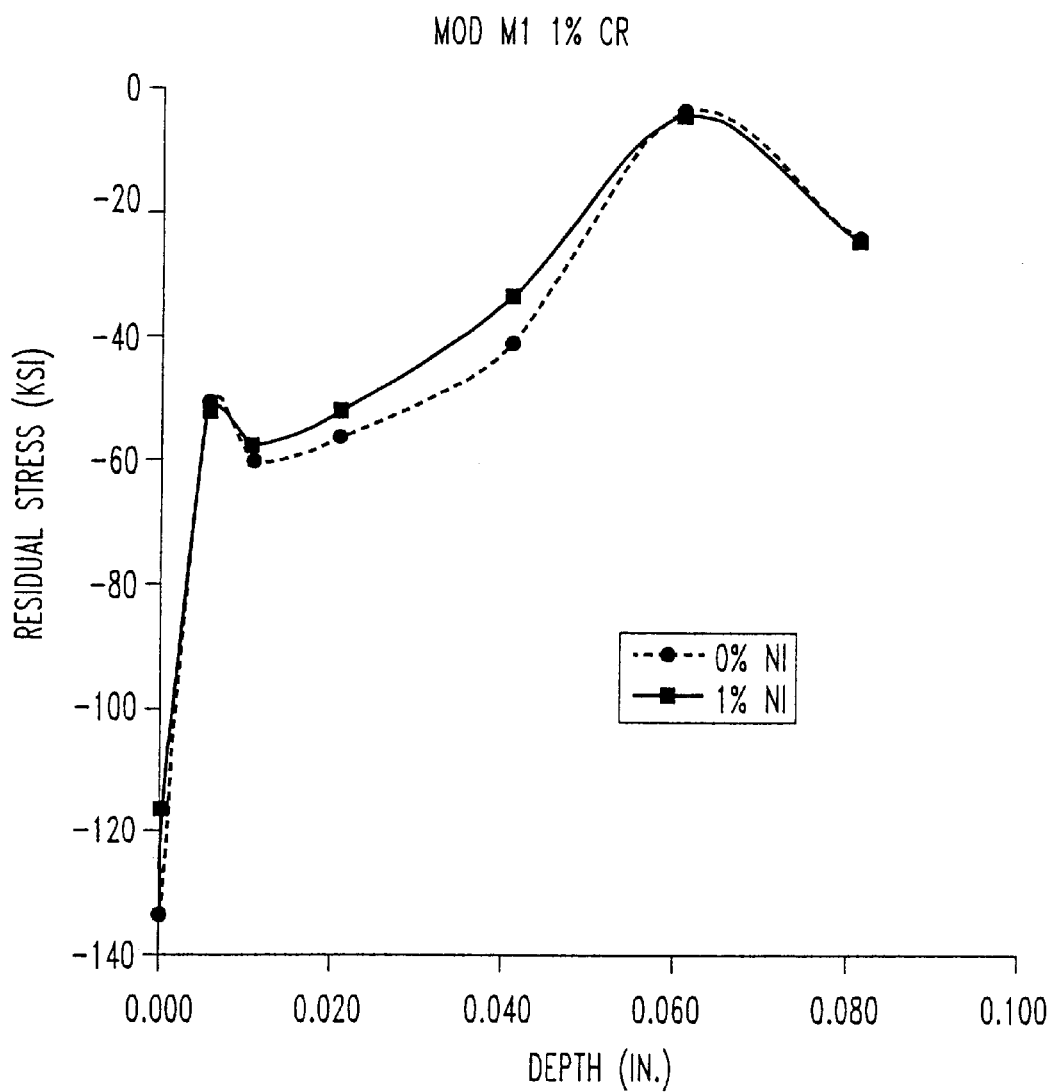
FIG. 12 is a graph showing residual stress vs. depth for a modified M1 1% chromium alloy.
Figure 13:
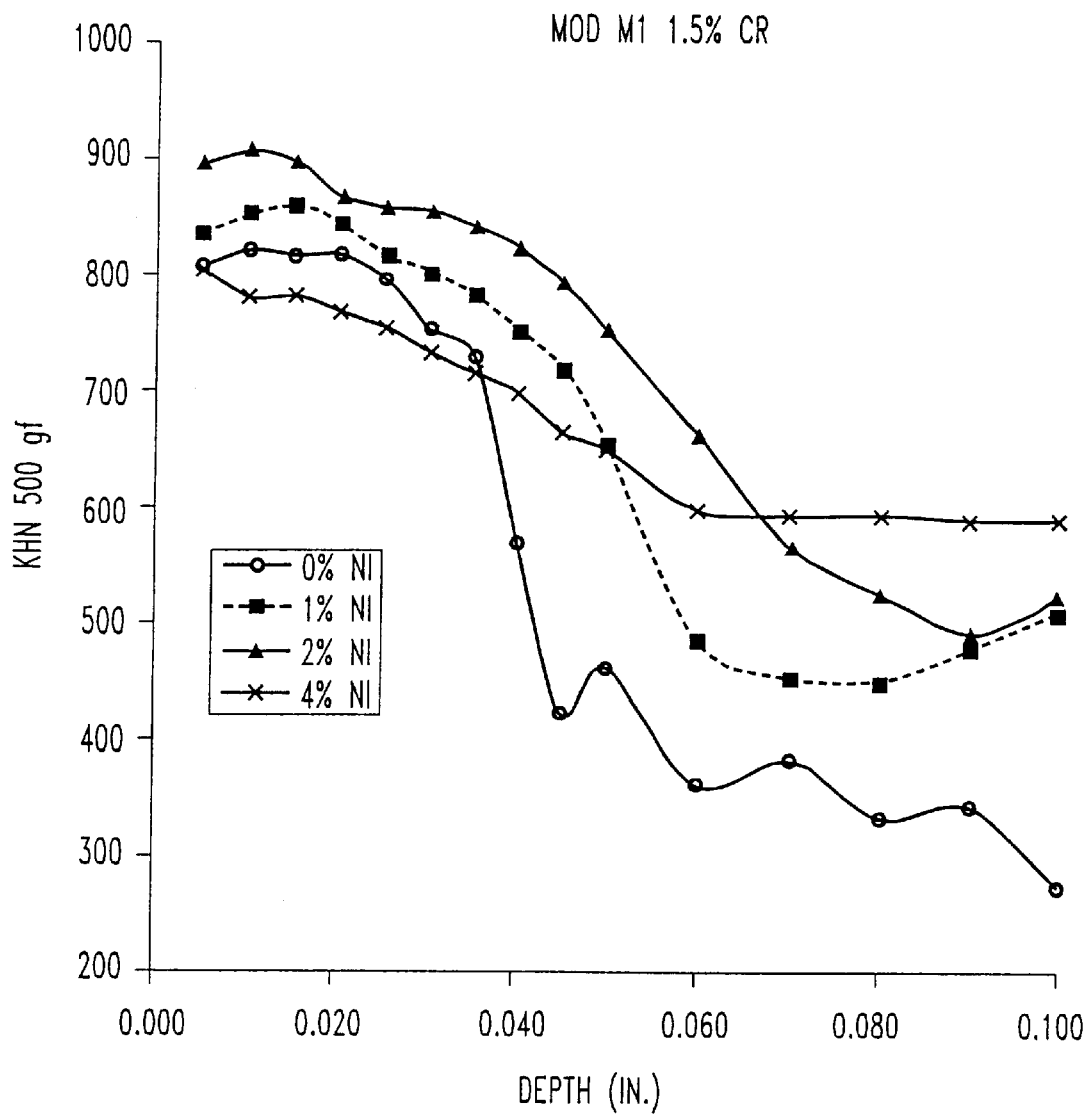
FIG. 13 is a graph showing hardness vs. depth for a modified M1 1.5% chromium alloy containing varying amounts of nickel.

For the 1% chromium heats, little difference was noted regarding the hardness profiles or residual stress profiles for either 0% Ni or 1% Ni, see FIGS. 11 and 12. However, the nickel content of the steels was seen to affect several properties when the chromium content was increased to 1.5%. When the hardness profiles are considered, 2% Ni appears to be most beneficial, and 1% Ni still increases the near surface hardness. At the 4% Ni level, surface hardness is degraded, see FIG. 13.

Figure 14:
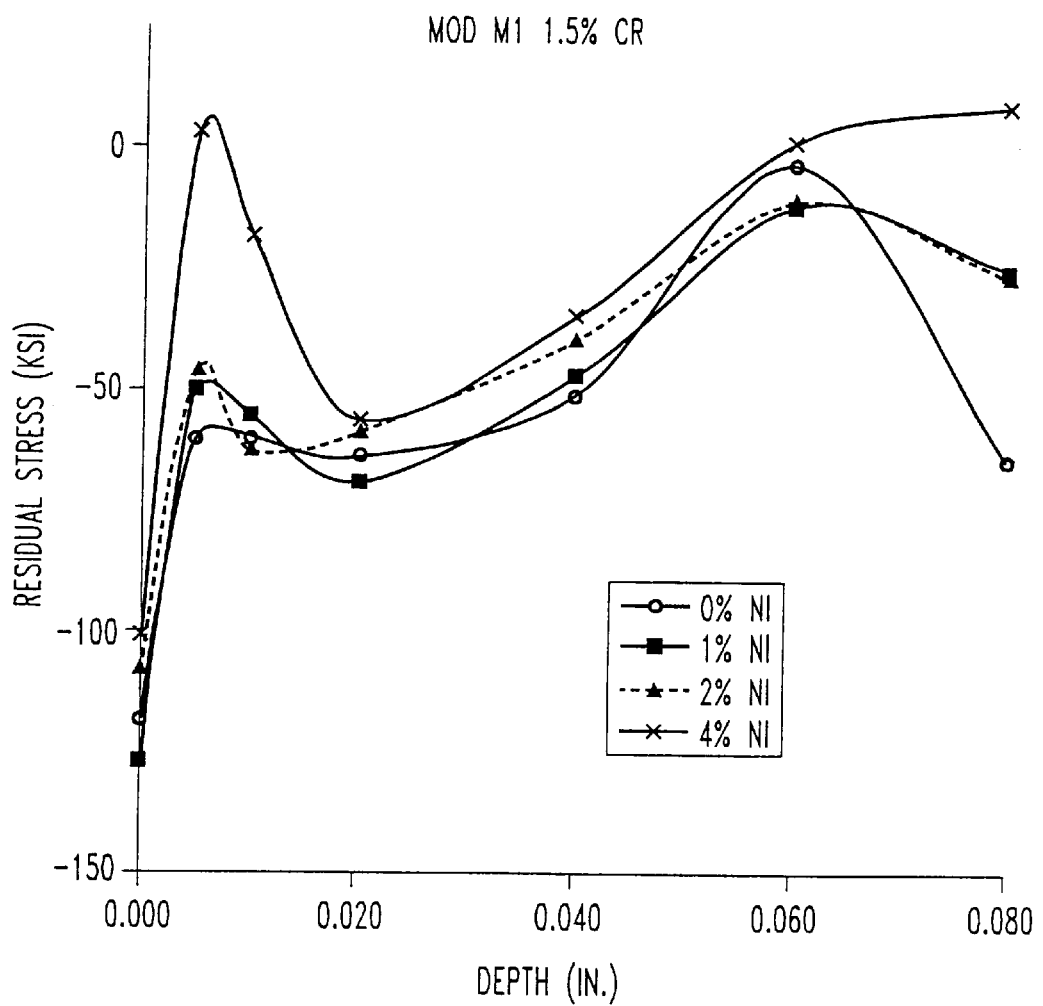
FIG. 14 is a graph showing residual stress vs. depth for a modified M1 1.5% chromium alloy containing varying amounts of nickel.

The residual stress distributions in the 1% chromium alloys were not affected by nickel contents up to 1%, see FIG. 14. However, for the low carbon alloys containing 1.5% chromium, a nickel content of 1% appeared to have the greatest influence in developing surface compressive residual stresses, see FIG. 14. Nickel contents in excess of 2% appeared to be detrimental to the residual stress profile. Subsurface tensile stresses occurred at a nickel content of 4%.

The fracture toughness of the modified alloys containing a nominal carbon content of 0.22% was excellent, see Table 7. However, for the 1.5% chromium steels, as the nickel content increased, the toughness was found to decrease (see heats 1482 and 1483), Table 7. For high chromium alloys having a chromium content of approximately 3.5%, the addition of nickel up to approximately 2% improved the toughness of these alloys, see Table 8 below, Heat 1486.

TABLE 8

Effect of Ni Toughness of M1 HSS

| HEAT | C | Cr | Ni | Mo | V | W | Fracture Toughness (ksi√in) |
|---|---|---|---|---|---|---|---|
| 1484 | 0.81 | 3.55 | 0.10 | 8.90 | 1.17 | 1.56 | 11.3 |
| 1485 | 0.79 | 3.62 | 1.05 | 8.86 | 1.18 | 1.31 | 12.8 |
| 1486 | 0.77 | 3.61 | 1.97 | 8.85 | 1.15 | 1.07 | 15.4 |
| 1487 | 0.79 | 3.57 | 3.83 | 8.62 | 1.09 | 0.57 | 15.7 |

Example 7

Another series of modified M50 Nil split heats having the compositions set forth in Table 9 were melted and fabricated into cylinders for evaluation. Here again, the alloys were carburized using standard procedures employed for alloy steel carburizing. No preoxidation or other processing that is required for alloy CBS M50 Nil was employed. This series of alloys will be referred to as M50 Niller.

TABLE 9

M50 Nil Steels

| HEAT | C | Cr | Ni | Mo | V | W | Fracture Toughness (kisVin) |
|---|---|---|---|---|---|---|---|
| 1488 | 0.20 | 0.61 | 3.50 | 6.55 | 1.00 | 0.03 | 28.5 |
| 1489 | 0.75 | 0.55 | 3.39 | 6.49 | 1.47 | 0.56 | 19.8 |
| 1490 | 0.22 | 1.08 | 3.59 | 6.63 | 1.34 | 0.06 | 28.9 |
| 1491 | 0.83 | 0.95 | 3.37 | 6.49 | 1.07 | 0.08 | 18.9 |
| 1492 | 0.20 | 1.33 | 3.22 | 6.03 | 0.54 | 0.03 | 33.0 |
| 1493 | 0.66 | 1.26 | 3.12 | 5.95 | 0.51 | 0.22 | 21.9 |
| 1494 | 0.19 | 1.95 | 3.52 | 6.53 | 1.22 | 0.01 | |
| 1495 | 0.78 | 1.96 | 3.41 | 6.44 | 1.14 | 0.01 | 19.6 |
| M50 Nil | 0.13 | 4.15 | 3.40 | 4.25 | 1.20 | 0 | 50 |

Figure 15:
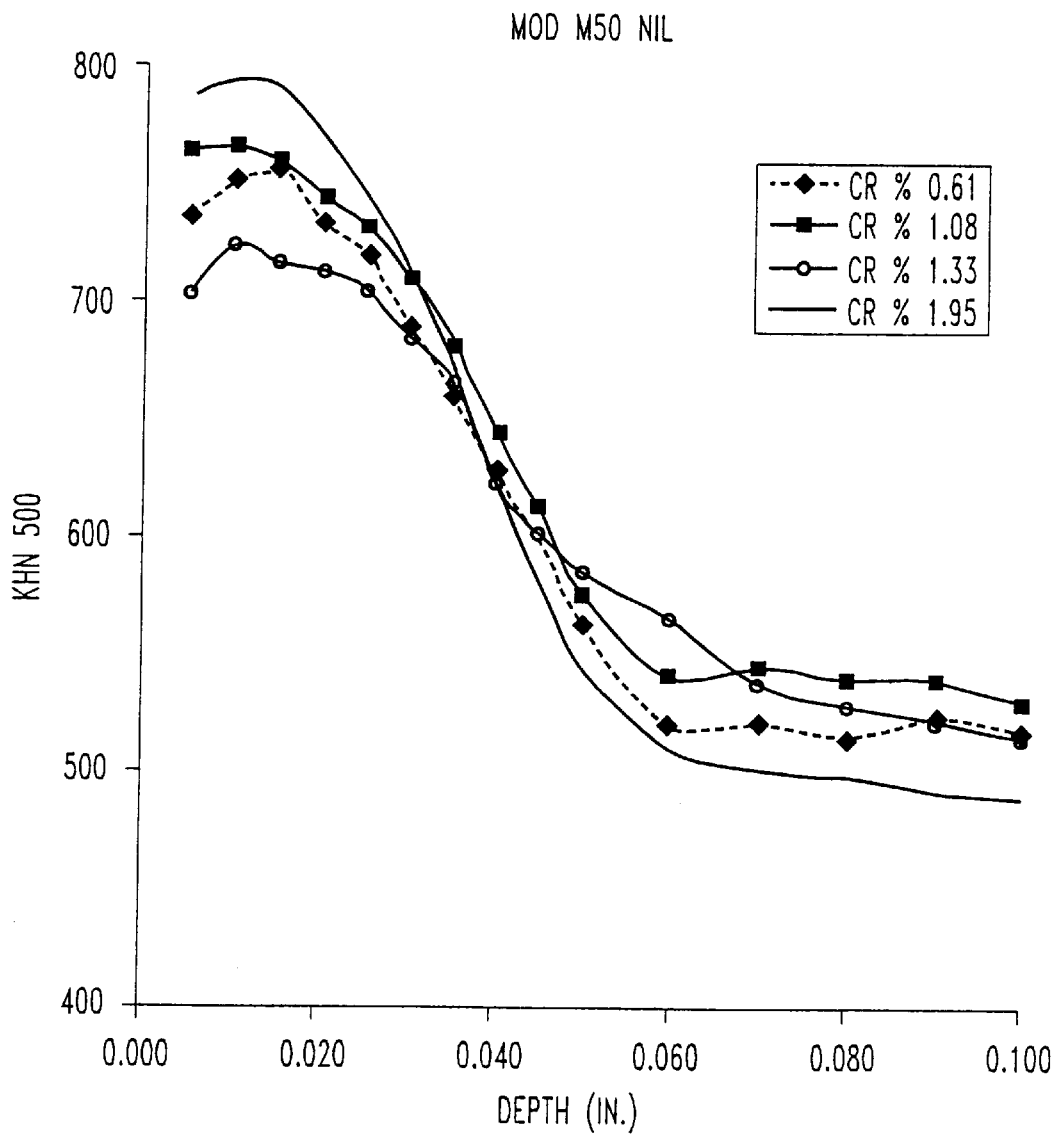
FIG. 15 is a graph showing hardness vs. depth for a number of modified M50 Nil alloys containing varying amounts of chromium.
Figure 16:
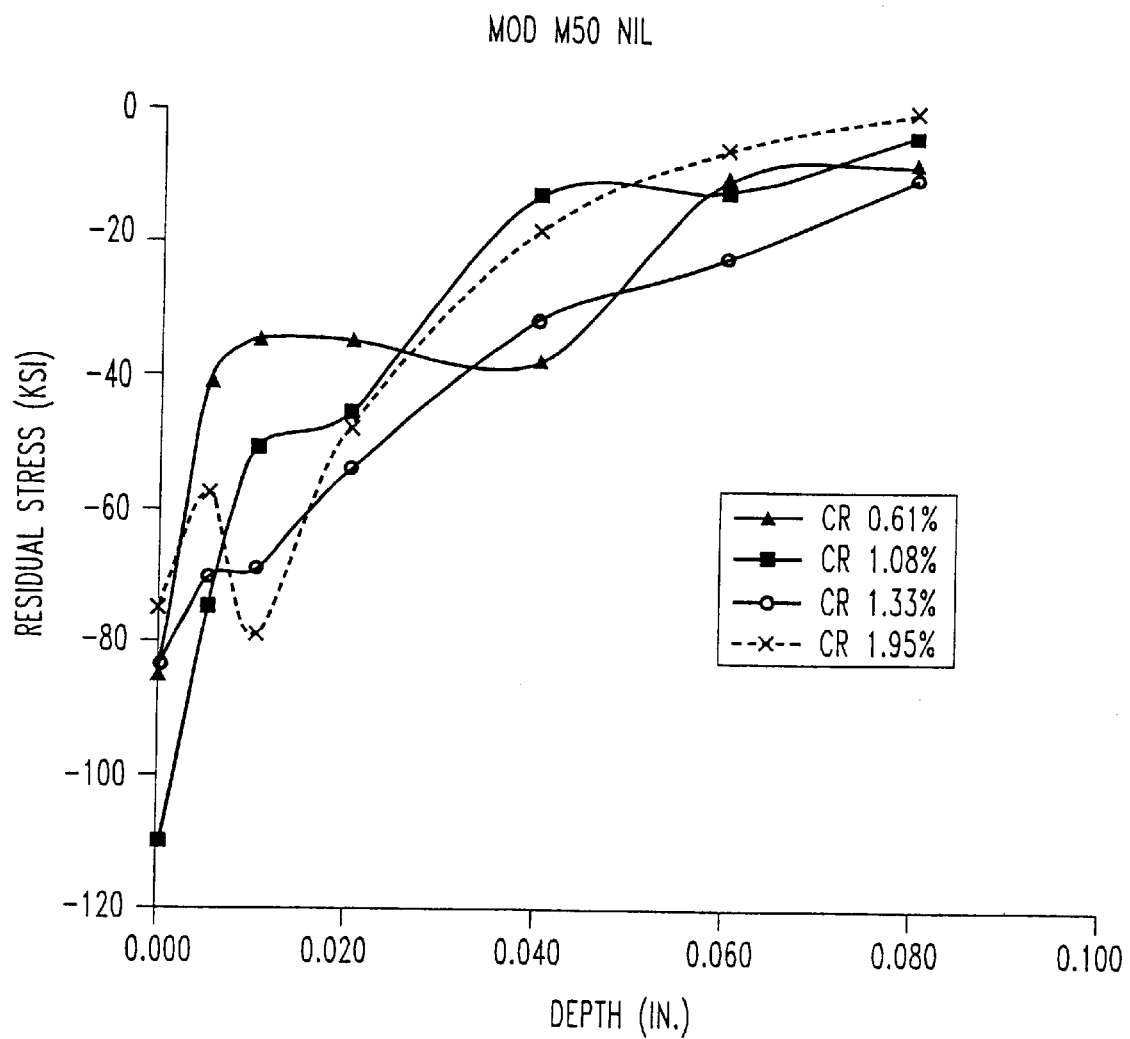
FIG. 16 is a graph showing residual stress vs. depth for a number of modified M50 Nil alloys containing varying amounts of chromium.

M50 Nil was developed to be a low carbon, carburizable version of the 0.80% carbon alloy designated M50; re U.S. Pat. No. 4,659,241. One of the major design requirements of this alloy was that the tungsten would not be used as an alloying element. The nickel content of the alloy was increased relative to M50 to enhance toughness. However, the chromium content of standard M50 was maintained in the new grade. This created difficulties in carburizing the steel because, due to the high chromium content of the alloy, it was necessary to preoxidize components that were to be carburized. This is one of the essential, unique aspects of this patent. By reducing the chromium content and increasing the quantities of the other alloying elements, carburizing is easy to perform and there is no degradation of other mechanical properties. The hardness profiles of M50 Nil alloy heats 1488, 1490, 1492 and 1494 indicate that for chromium levels ranging up to 1.95%, surface hardnesses in excess of 700 KHN can be achieved, FIG. 15. For heat 1490, the near surface hardness was approximately 750 KHN. The residual stress profiles in these alloys were found to be excellent, FIG. 16. The most compressive surface residual was obtained with heat 1490 containing 1.08% Cr.

The fracture toughness of these heats containing a nominal carbon content of 0.20% ranged from 28 to 32 Ksi (sq.rt.(in.)), Table 10. These toughness levels are approximately 50% greater than the toughness levels of the corresponding grades containing 0.80% carbon. Alloy M50 Nil contains only 0.13% carbon and, hence, it has a higher toughness level than found for these alloys. Reducing the carbon level of these particular steels would enhance the toughness of the alloys.

Figure 17:
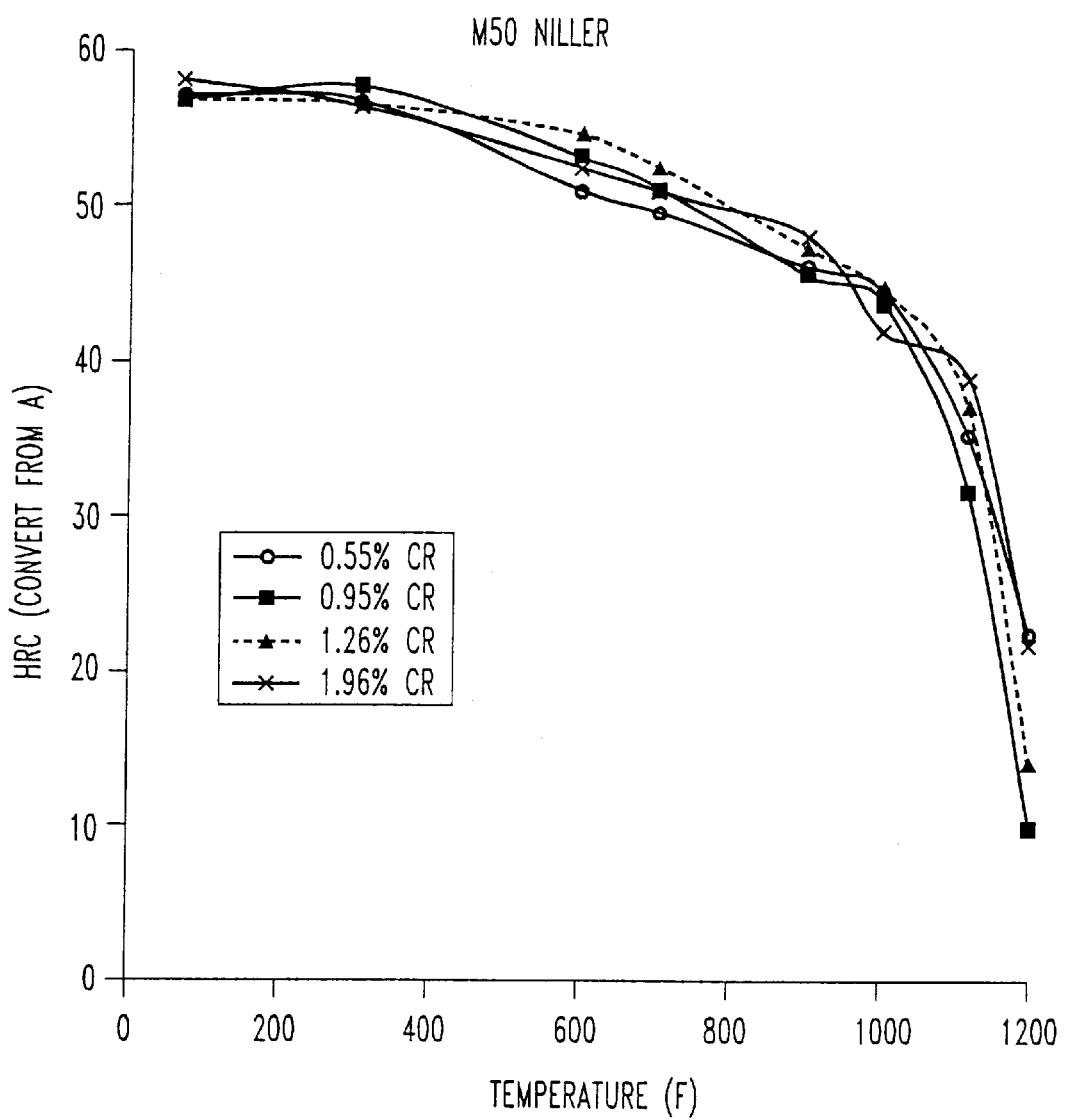
FIG. 17 is a graph showing hardness vs. temperature for a number of M50 Nil alloys containing varying amounts of chromium.
Figure 18:
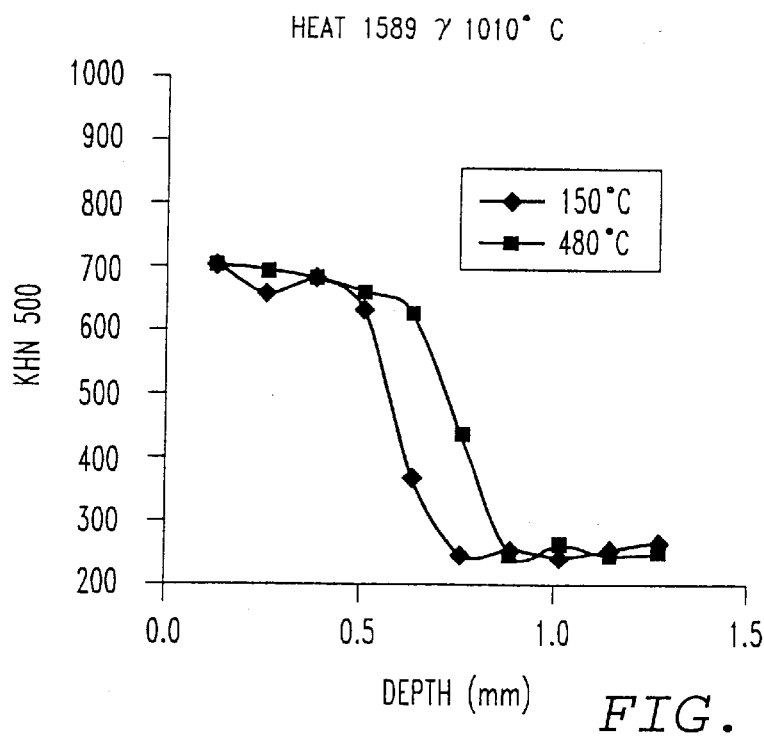
FIG. 18 is a graph showing hardness vs. case depth for Heat 1589 austenitized at 1010° C. with different tempering temperatures.
Figure 19:
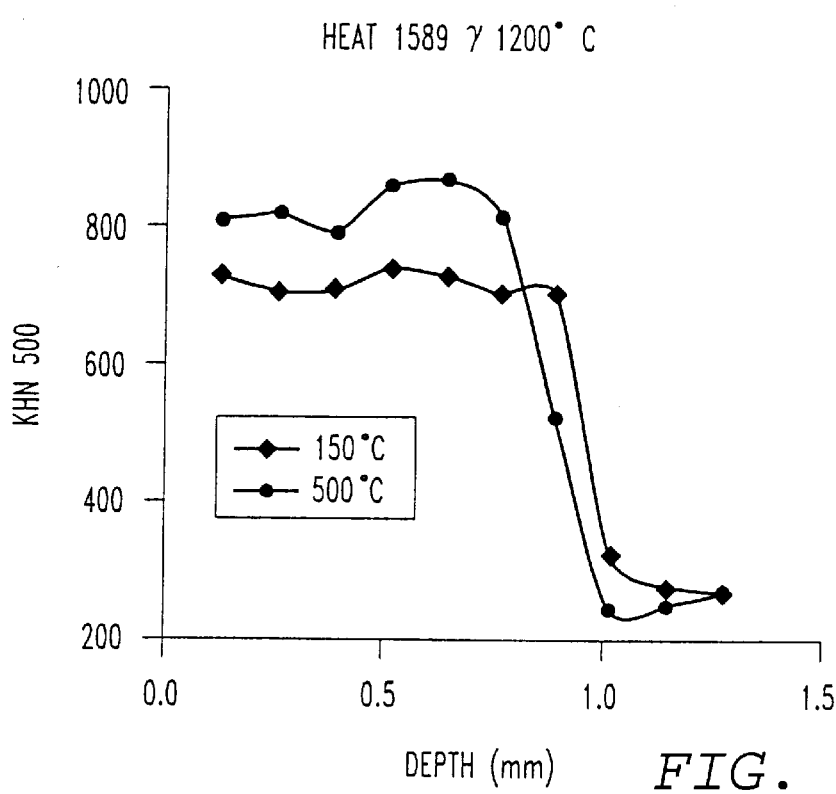
FIG. 19 is similar to FIG. 18 wherein the specimens were austenitized at 1200° C.
Figure 20:
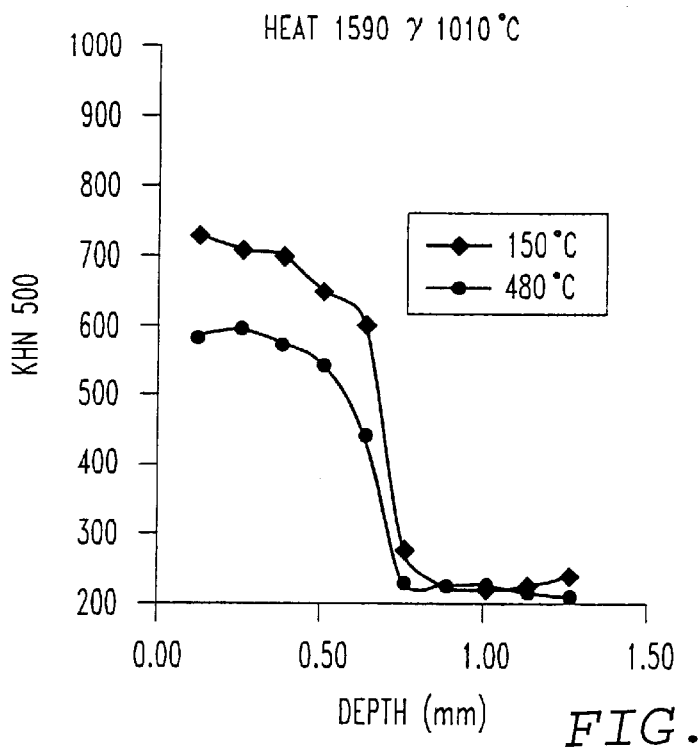
FIG. 20 is similar to the graph of FIG. 18 but involving Heat 1590.
Figure 21:
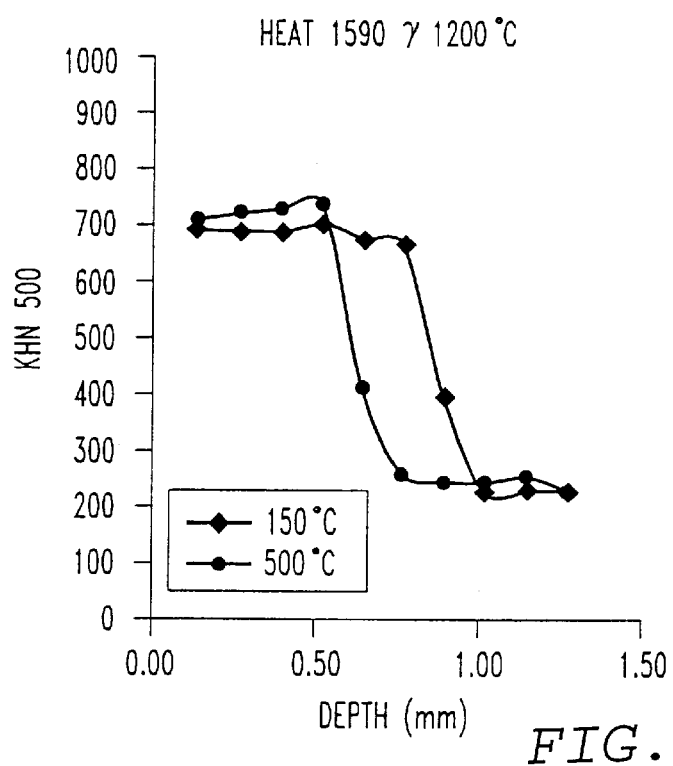
FIG. 21 is similar to FIG. 19 involving Heat 1590.

The hot hardness of M50 Nil was tested using heats 1489, 1491, 1493 and 1495, FIG. 17. As is the case for other high speed steel alloys, there was a gradual decrease in hot hardness as temperatures increased from room temperature to approximately 900° F. For temperatures in excess of 900° F., the hardness rapidly decreased with increasing temperature. It is important to note that for these alloys containing a nominal carbon content of approximately 0.80%, the room temperature hardness was slightly less than 60 HRC. For the similar carburized grades, the near surfaces' hardnesses were as high as 790 KHN, 63 HRC.

Example 8

The scope of the present invention is not limited to high speed steels. For example, the principles of the present invention may be applied to die steels that can contain up to 12% chromium and lesser amounts of tungsten, molybdenum and vanadium than high speed steels. H 13 is a typical hot working die steel containing approximately 5.25% chromium. As in the case of the high speed steels, this level of chromium is too great to allow the material to be carburized using standard practices. Several alloys containing 1.0% chromium, increased levels of molybdenum and vanadium and additions of tungsten were fabricated, Table 10.

TABLE 10

Modified H 13 Alloys

| HEAT | C | Si | Cr | Mo | V | W | Fracture Toughness (ksiVin) |
|---|---|---|---|---|---|---|---|
| 1589 | 0.29 | 1.41 | 1.36 | 10.00 | 2.40 | 1.38 | 39.4 |
| 1590 | 0.25 | 1.10 | 1.30 | 6.30 | 3.12 | 1.12 | 50.1 |
| H 13 | 0.40 | 1.00 | 5.25 | 1.35 | 1.00 | 0 | |

These alloys were carburized using standard procedures. After carburizing, one group of specimens was austenitized at 1850° F. for one hour and oil quenched to room temperature; another group of specimens was austenitized at 2190° F. for 30 minutes and oil quenched to room temperature. Tempering of these specimens was performed at 300° F. and at 932° F. The hardness profiles clearly reveal that the alloys were successfully carburized, FIGS. 18–21. For heat 1589, the near surface hardness was approximately 700 KHN when the austenitizing temperature was 1850° F. When austenitized at 2190° F., the near surface hardness was approximately 800 KHN for a tempering temperature of 932° F. For alloy 1590, when hardened at 1850° F., the near surface hardness was approximately 729 KHN for a tempering temperature of 300° F. and 586 KHN for a tempering temperature of 932° F. When an austenitizing temperature of 2190° F. was employed, the near surface hardnesses were approximately 694 and 713 KHN for tempering temperatures of 300° F. and 932° F., respectively.

Example 9

Two modifications identified as Heats 1892 and 1894 according to the present invention and based upon M42 high speed steel are shown in Table 11. As with other examples based on the invention, the chromium content of these heats was decreased to approximately 1%. To offset the reduction in chromium, the amounts of tungsten, vanadium and molybdenum in the alloy were increased. The silicon content of the alloy was approximately 0.40%, and the nominal cobalt content of the alloy was 8%. The silicon and cobalt contents of the modified alloys of the invention were essentially the same as in the standard high carbon alloy. The steel was cast into ingots, forged to 1.5" squares and then rolled into 0.48" diameter bars. After rolling, the bars were carburized in a commercial facility at approximately 1760° F. (960° C.) using parameters previously described, and quenched in oil.

Figure 23:
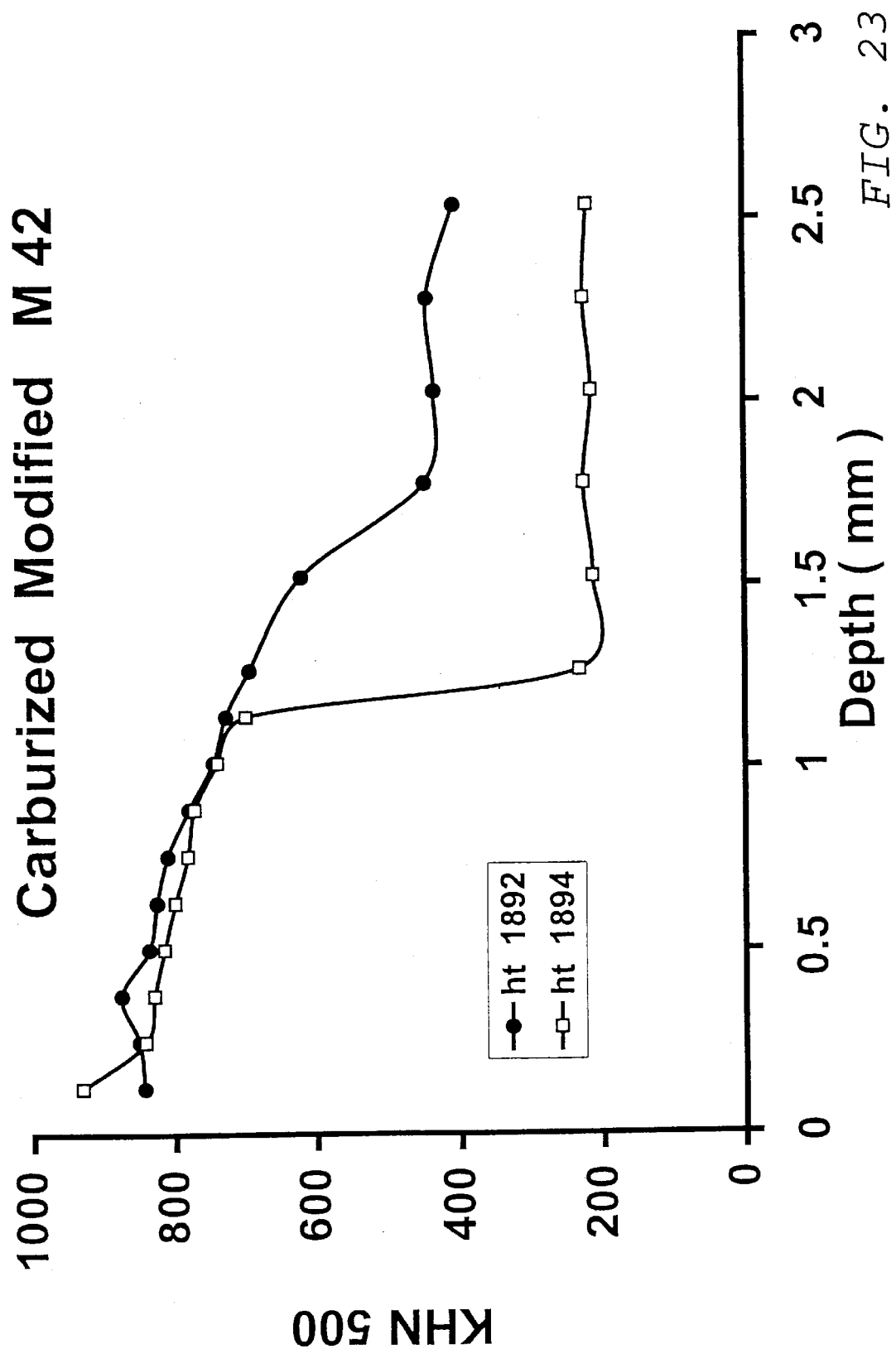
FIG. 23 is a graph showing hardness vs. depth comparing heats 1892 and 1894 for a carburized, modified M42 alloy.

Following the oil quench, smaller specimens were cut from the bars. These specimens were preheated at about 1600° F. (8870° C.) for 1 hour, then austenitized at 2190° F. (1200° C.) and held at temperature for 15 minutes. The specimens were then quenched in oil to room temperature. Following the quench, the specimens were double tempered by heating for two hours at 975° F. (525° C.) and then air cooled to room temperature. The specimens were then re-tempered by heating at 975° F. (525° C.) for two hours followed by air cooling to room temperature. The specimens were then cross-sectioned and prepared for standard metallographic analysis. In addition, a Knoop microindentation hardness traverse was performed on each of the specimens, the results of which are depicted graphically in FIG. 23. As indicated, the hardness of the specimens exceeded 800 KHN$_{500}$ or 60 HRC for at least 0.050" for each specimen. Since the tempering response of these alloys was unknown, 975° F. (525° C.) was an initial estimate of the appropriate tempering temperature. As shown for other alloys described herein, nickel could also be added to this steel to increase its toughness.

TABLE 11

Modified M42 Alloys

| Heat | C | Si | Cr | Mo | V | W | Co |
|---|---|---|---|---|---|---|---|
| 1892 | 0.31 | 0.41 | 0.87 | 10.25 | 1.29 | 2.44 | 7.88 |
| 1894 | 0.31 | 0.43 | 0.89 | 10.76 | 1.47 | 4.03 | 7.90 |

For the conventional high speed steels containing 0.80% carbon or more, austenitizing temperatures can range from a low of 2025° F. (1107° C.) to as high as 2260° F. (1238° C.) depending upon the specific alloy, Table 12. The primary carbides in these alloys form directly from high carbon liquid steel. Thus, some of the carbides in the alloys are the lowest melting constituents in the alloys.

TABLE 12

Austenitizing Temperatures for Standard High Speed Steel Alloys

| | Austenitizing Temperature (° F.) | |
|---|---|---|
| Alloy | Minimum | Maximum |
| M1 | 2175 | 2225 |
| M2 | 2200 | 2250 |
| M3 | 2200 | 2250 |
| M4 | 2200 | 2250 |
| M7 | 2200 | 2240 |
| M42 | 2175 | 2200 |
| M50 | 2025 | 2050 |
| T15 | 2230 | 2260 |
| Range | 2025 (1107° C.) | 2260 (1238° C.) |

In the steels of the present invention, the majority of the carbides are formed by solid state reactions. Carbon is diffused into the alloys at approximately 1760° F. (960° C.) during the carburizing process. The steels are then austenitized at a temperature that is significantly greater than that employed for carburizing. In the examples set forth in Table 12, the M1 alloys were austenitized at approximately 2192° F. (1200° C.). The M2 alloys were austenitized at 2219° F. (1215° C.). The modified M50 alloys were austenitized at 2039° F. (1115° C.), and the M42 variation was austenitized at 2192° F. (1200° C.). For these types of alloys, as the austenitizing temperature is increased, more carbides are dissolved. After the steel is quenched, tempering causes small carbides to precipitate and, thus, the hardness of the steel is increased. This is caused by the secondary hardening effect. Based upon composition, austenitizing temperatures ranging from 2057° F. (1125° C.) through 2237° F. (1225° C.), and tempering temperatures from 975° F. (525° C.) to 1022° F. (550° C.) (in a double tempering treatment) can be used to optimize the properties of the present alloys.

In summary, the high surface and sub-surface hardnesses obtained by the alloys and process of the present invention result from the diffusion of carbon into the steel as well as from the secondary hardening phenomena that occurs by the heat treating procedures of the invention. The secondary hardening phenomena is primarily controlled by the presence of Cr, Mo, V, W. As stated herein, the Cr content of the instant alloys is preferably less than 1.5%. As the Cr content of the steel is decreased, the diffusion of carbon is increased and lower chromium prevents the formation of surface oxides that can decrease the efficiency of carburization. Because of the relatively high levels of Mo, V, W and the low Cr content of 1–1.5%, the present alloys undergo secondary hardening as a result of the high temperature austenitizing treatment and the double tempering treatment provided by the process of the invention. As a result, the surface hardness of the present alloys after processing exceeds 60 HRC, and generally ranges from 63 to 66 HRC.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

I claim:

1. A carburizable, high speed steel possessing high hardness and fracture resistance comprising, in % by weight, up to 0.4% C, less than 2% Cr, 1.5–3.5% Ni, one or more alloy constituents selected from the group consisting of up to 28% W, 4.0–15.3% Mo, up to 13% Co, and 1.0–5.7% V in an aggregate amount including the Cr content of 7.5–35%, 0.10–0.60% Mn, 0.03 max % P, 0.03 max % S, 0.15–0.65% Si, up to 2% Ni, and balance Fe plus incidental impurities.

2. A carburizable, high speed steel possessing high hardness and fracture resistance comprising, in % by weight: 0–0.4% C; 0.5–1.5% Cr; 1.5–3.5% Ni; 0.1–0.6% Mn; 0.15–0.65% Si; 0.03 max % P; 0.03 max % S; one or more members selected from the group consisting of 4.0–15.3% Mo; 1.0–5.7% V; up to 13% Co and up to 28% W, and wherein the aggregate amount of (%Cr+%Mo+%V+%W+%Co) is 7.5–35% and balance essentially Fe and incidental impurities.

3. A carburizable, high speed steel possessing high hardness and a fracture resistance comprising a modified M50 HSS consisting essentially of: 0.0% C≦0.40, 0.50≦% Cr≦1.50, 2.50≦% Ni≦3.50, 4.0≦% Mo≦11.0, 1.0≦% V≦4.50, 0.10–0.60% Mn, 0.03 max % P, 0.03 max % S, 0.15–0.65% Si, and balance Fe plus incidental impurities.

4. A carburizable, high speed steel possessing high hardness and fracture resistance comprising a modified M1 HSS consisting of: 0.0≦%C≦0.40, 0.50≦% Cr≦1.50, 1.50≦% Ni≦2.50, 8.2≦% Mo≦15.3, 1.0≦% V≦4.20, 1.40≦% W≦18.6, 0.10–0.60% Mn, 0.03 max % P, 0.03 max % S, 0.15–0.65% Si, and balance Fe plus incidental impurities.

5. A carburizable, high speed steel possessing high hardness and fracture resistance comprising a modified M2 HSS consisting essentially of: 0.0≦% C≦0.40, 0.50≦% Cr≦1.50, 1.50≦% Ni≦2.50, 4.5≦% Mo≦13.0, 1.7≦% V≦5.7, 5.5≦% W≦28.0, 0.10–0.60% Mn, 0.03 max % P, 0.03 max % S, 0.15–0.65% Si, and balance Fe plus incidental impurities.

6. A carburizable, high speed steel possessing high hardness and fracture resistance comprising, in % by weight, up to 0.4% C, less than 1.50% Cr, 1.5–3.5% Ni, one or more alloy constituents selected from the group consisting of up to 28% W, 4.0–15.3% Mo, up to 13% Co, and 1.0–5.7% V in an aggregate amount including the Cr content of 7.5–30%, 0.10–0.60% Mn, 0.03 max % P, 0.03 max % S, 0.15–0.65% Si, up to 3% Ni, and balance Fe plus incidental impurities.

7. A modified high speed steel comprising, in % by weight, up to 0.4% C, less than 1.50% Cr, 1.5–3.5% Ni, one or more alloy constituents selected from the group consisting of up to 28% W, 4.0–15.3% Mo, up to 13% Co, and 1.0–5.7% V in an aggregate amount including the Cr content of at least 7.5% up to about 30%, 0.10–0.60% Mn, 0.03 max % P, 0.03 max % S, 0.15–2.0% Si, up to 3% Ni, and balance Fe plus incidental impurities.

8. A method of formulating a modified high speed steel composition suitable for carburization comprising the steps of:

(a) selecting a conventional high speed steel composition;

(b) modifying the composition of said conventional high speed steel composition selected in step (a) by decreasing a Cr content to less than 2% by weight;

(c) determining a reduction in hardness of said conventional high speed steel composition resulting from the decrease of the Cr content in step (b);

(d) increasing the content of one or more of Mo, V and W in the steel composition to compensate for the hardness reduction determined in step (c) to formulate a composition for said modified high speed steel composition; and (e) melting and processing said modified high speed steel composition formulated in step (d).

9. The method of claim 8 herein the reduction in hardness in step (c) is obtained by determining an amount of carbon as $Cr_7C_3$ removed as a result of the decreased Cr content and then by calculating reduction in hardness by use of an equation:

$$\text{Vickers hardness} = 550 \{\%C^{0.8702}\}$$

wherein C is equal to the amount of carbon as $Cr_7C_3$ removed.

10. The method of claim 8 wherein an amount of increase of one or more of Mo, V and W to compensate for the hardness reduction is calculated by use of one or more of the following equations:

$$\text{Vickers hardness (Mo)} = 764 \{\%C^{0.6037}\}$$

$$\text{Vickers hardness (V)} = 678 \{\%C^{0.5974}\}$$

$$\text{Vickers hardness (W)} = 584 \{\%C^{0.6039}\}$$

wherein C is equal to the amount of carbon present in one of a Mo, V or W as an alloy carbide, respectively.

* * * * *

UNITED STATES PATENT AND TRADEMARK OFFICE
CERTIFICATE OF CORRECTION

PATENT NO. : 6,702,981 B2
DATED : March 9, 2004
INVENTOR(S) : Dennis W. Hetzner

It is certified that error appears in the above-identified patent and that said Letters Patent is hereby corrected as shown below:

Title Page,
Item [57], ABSTRACT,
Line 9, "0.1-0.6% M" should read -- 0.1-0.6% Mn --.

Column 20,
Line 42, "0.0% C" should read -- $0.0 \leq \% \ C$ --.

Column 22,
Line 1, "herein the reduction" should read -- wherein the reduction --.
Line 4, "by calculating reduction" should read -- by calculating an incremental reduction --.

Signed and Sealed this

Twenty-seventh Day of July, 2004

JON W. DUDAS
*Acting Director of the United States Patent and Trademark Office*